Nov. 21, 1967     P. L. B. WHEELER ETAL     3,353,328
METHOD AND APPARATUS FOR FORMING AND FILLING RECEPTACLES
Filed Aug. 30, 1965     12 Sheets-Sheet 1
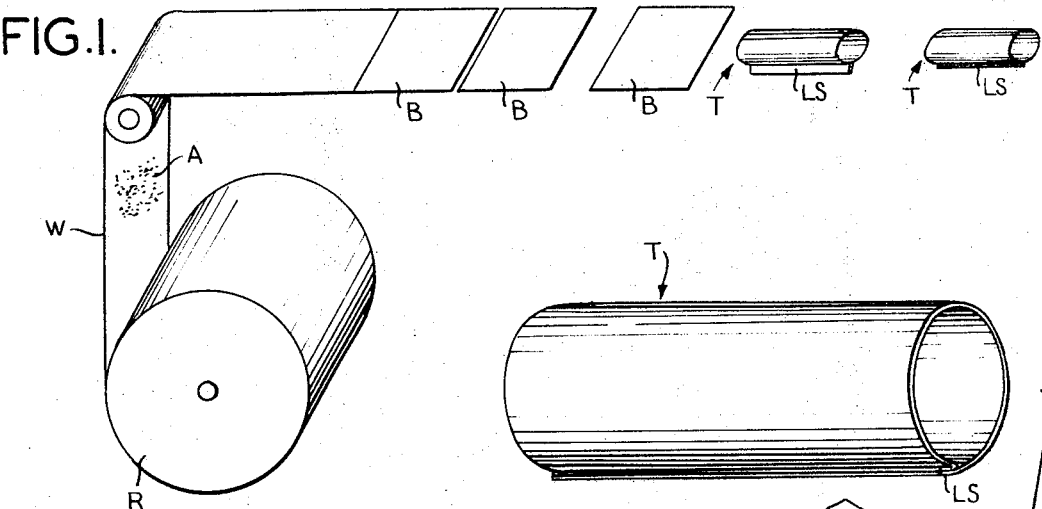
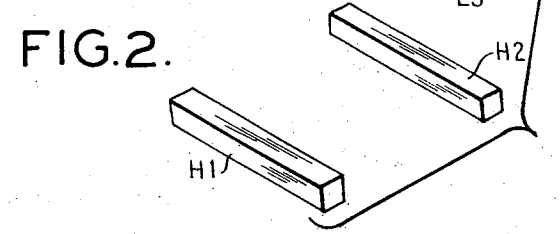
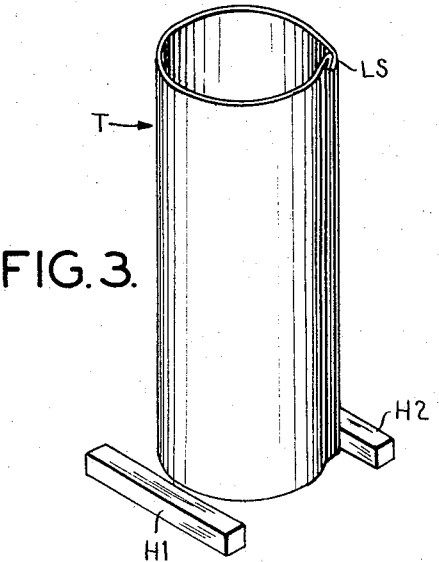
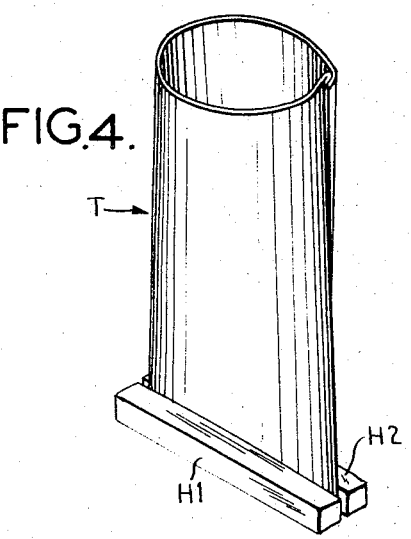
Paul L.B. Wheeler,
Edwin E. Keene,
Inventors.
Koenig, Senniger, Powers and Leavitt,
Attorneys.

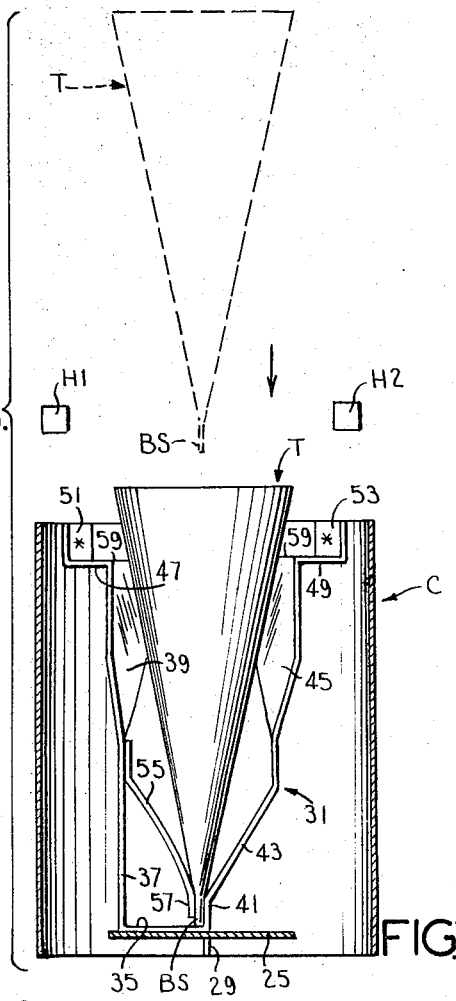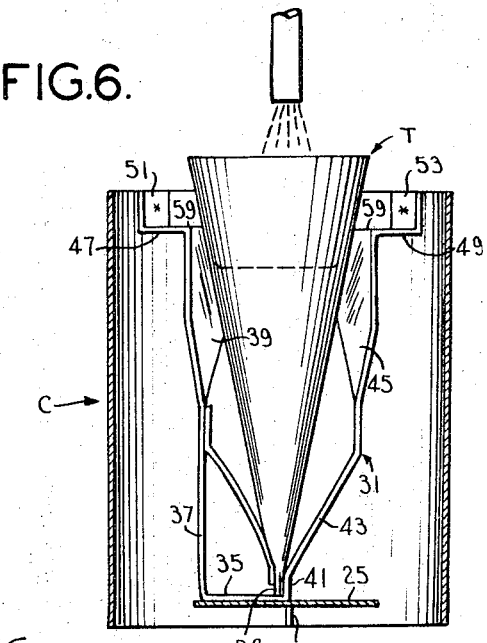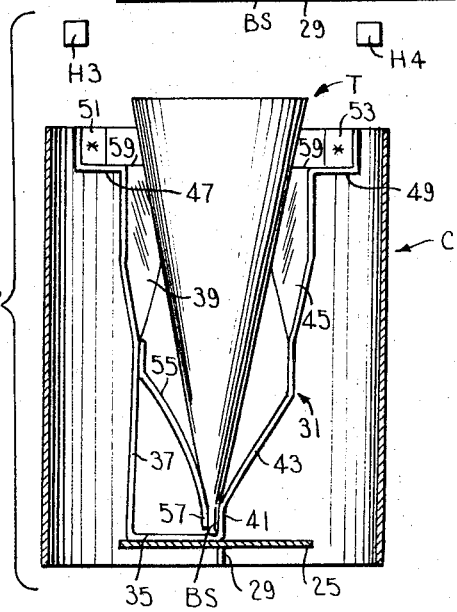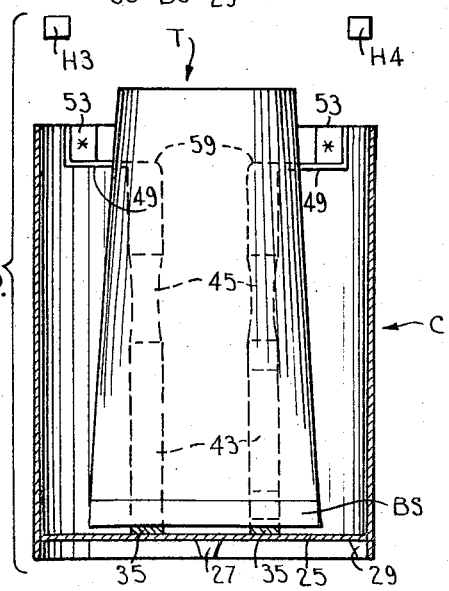

Nov. 21, 1967  P. L. B. WHEELER ET AL  3,353,328
METHOD AND APPARATUS FOR FORMING AND FILLING RECEPTACLES

FIG.15.
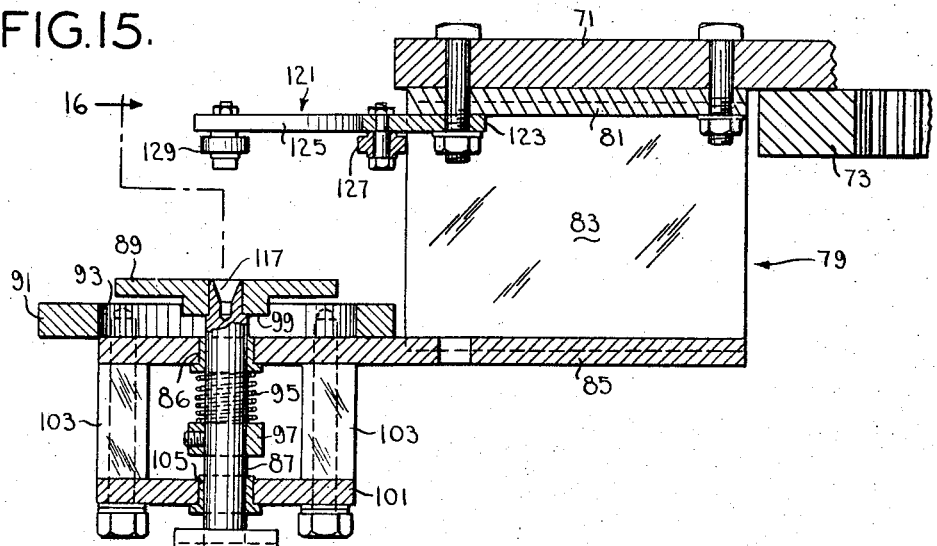
FIG.16.
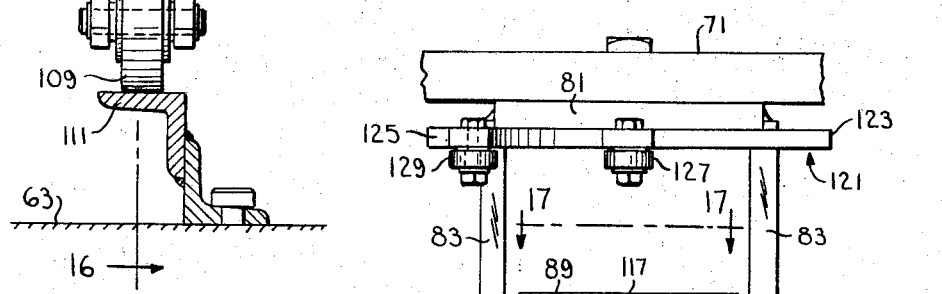
FIG.17.
FIG.18.
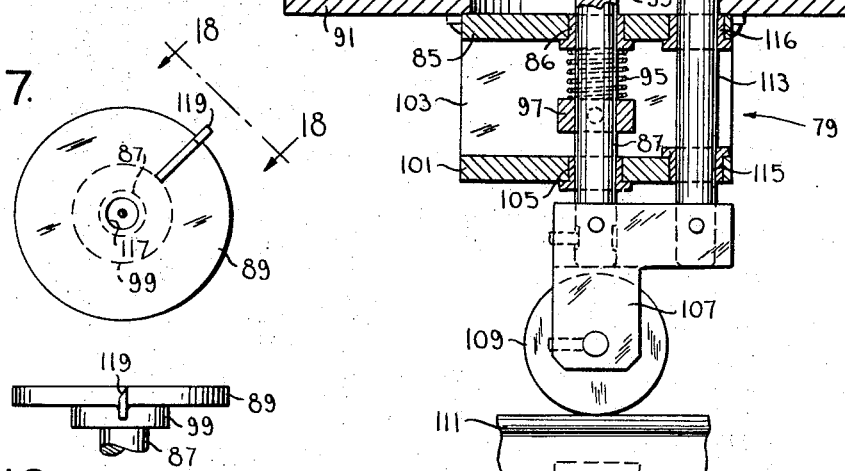

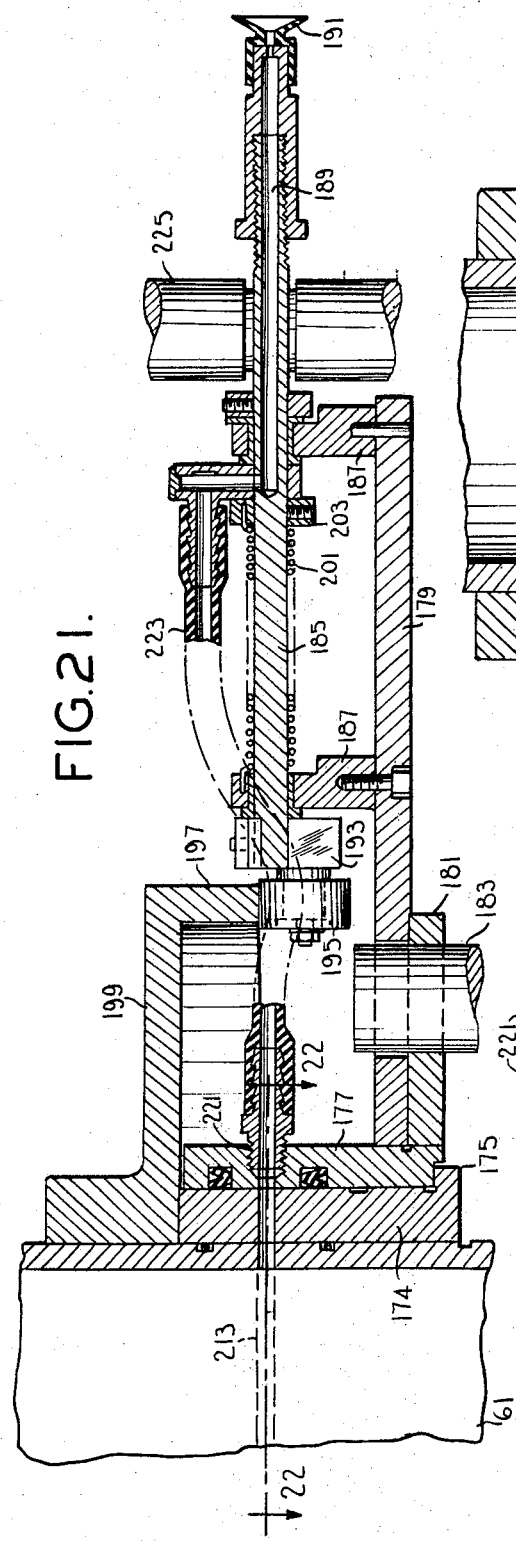
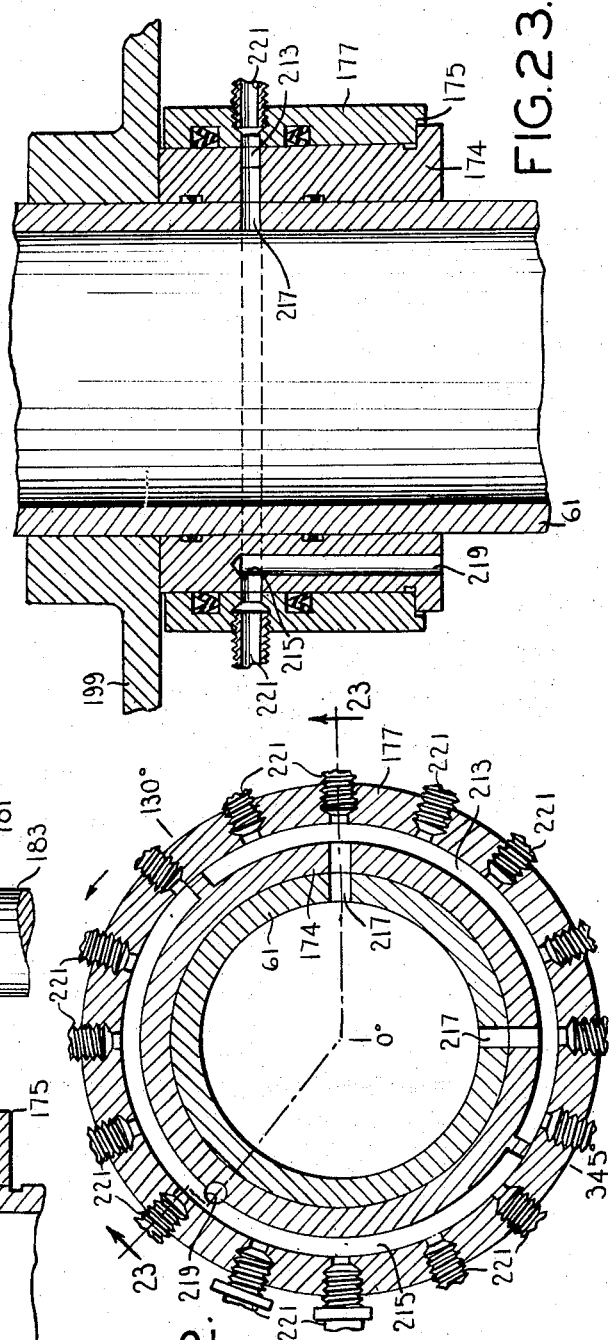

Nov. 21, 1967   P. L. B. WHEELER ETAL   3,353,328
METHOD AND APPARATUS FOR FORMING AND FILLING RECEPTACLES
Filed Aug. 30, 1965   12 Sheets-Sheet 9
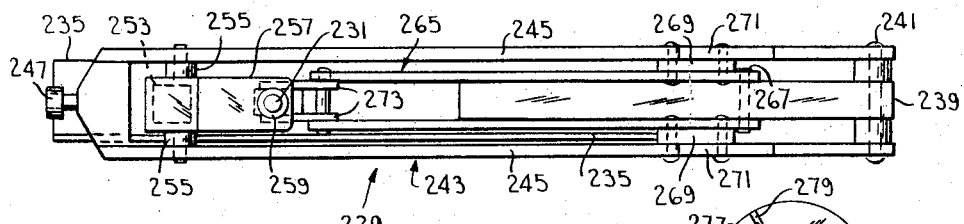
FIG.24.
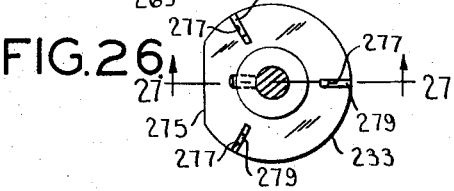
FIG.26.
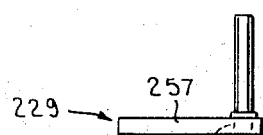
FIG.25.
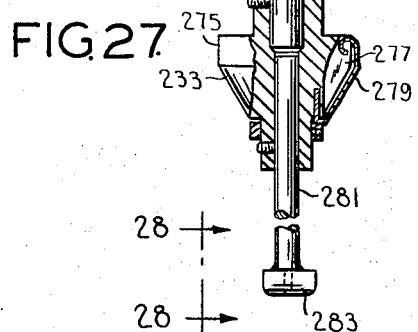
FIG.27.  FIG.28.
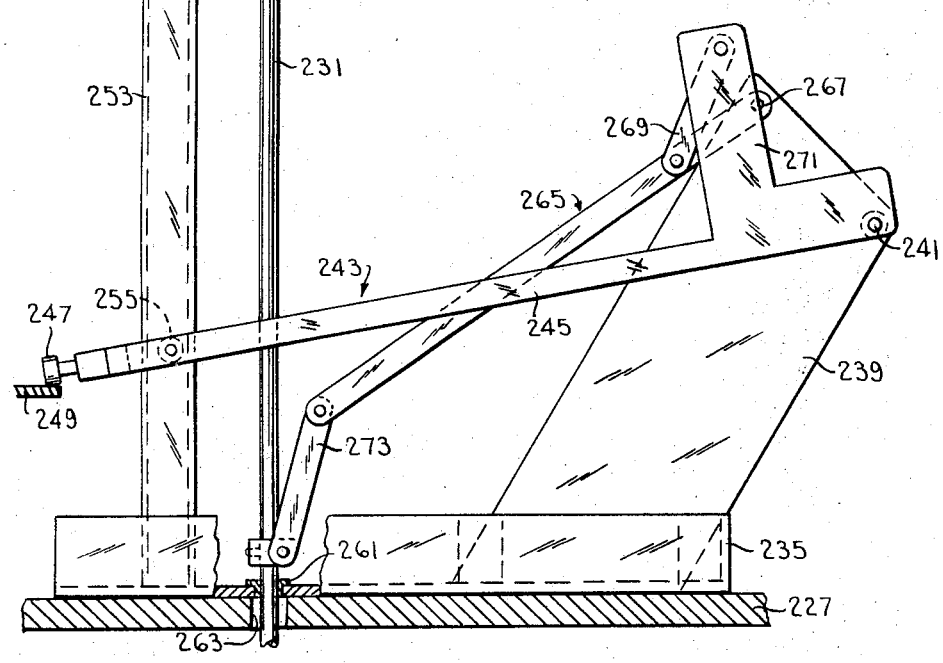

United States Patent Office 3,353,328
Patented Nov. 21, 1967

3,353,328
METHOD AND APPARATUS FOR FORMING
AND FILLING RECEPTACLES
Paul L. B. Wheeler, Wayland, and Edwin E. Keene, Middlesex, Mich., assignors to Packaging Frontiers, Inc., Waltham, Mass., a corporation of Delaware
Filed Aug. 30, 1965, Ser. No. 483,403
43 Claims. (Cl. 53—29)

This invention relates to packaging, and more particularly to methods of and apparatus for the forming, filling and sealing of packages made from flexible packaging material.

The invention is concerned with the forming, filling and sealing of packages of various shapes made from flexible packaging material. Examples of package shapes contemplated within the scope of the invention are tetrahedron-shaped packages and flat (pillow-shaped) packs or pouches. Other shapes may also be encompassed.

The invention may be regarded as an improvement upon the method and apparatus described in the coassigned copending U.S. patent of Richard C. Wagner et al. Patent No. 3,236,021, issued February 22, 1966, entitled Method and Apparatus for Forming and Filling Receptacles. In that application, there is disclosed a method and apparatus for forming, filling and sealing packages from flexible packaging material in which a web of flexible packaging material is formed into individual open-ended tubes and each tube is formed with a bottom seal, filled through its open upper end, and then formed with a top seal. The top seals may be made at right angles to the bottom seals so that the packages have the shape of a tetrahedron. The apparatus shown in said application comprises a circular series of vacuum-grip tube carriers each adapted to carry a tube in upright position around a circular path, a circular series of bottom sealers for sealing the bottoms of the tubes as they are carried around in said path, a circular series of fillers for filling the tubes after their bottoms have been closed, and a circular series of top sealers for sealing the tops of the tubes after they have been filled, all combined in a single rotatable turret. Among the several objects of this invention may be noted the provision of a method of and apparatus of the same general class as that of said copending application in which the filling operation is separated from the sealing operations, thereby readily enabling the use of various fillers, including existing and commercially available fillers. In this regard, one of the features of the invention is that the bottom sealing of the tubes is carried out in a bottom sealing unit, the tubes after the formation of the bottom seals being transferred to tube holders by means of which the bottom-sealed tubes are carried first through a filler in which they are filled through their open upper ends, and thence through a top sealing unit in which their upper ends are sealed. In addition to enabling use of various fillers, this enables simplication and mechanisms and adjustments, increased production speeds, greater flexibility in sealing, improved control of the tubes, reduction of the effect of product spillage (noting that spillage problems are confined to the filler), and reduction of sanitization problems where packaging operations need to be sanitized. Other objects which may be noted are the provision of apparatus such as described in which the tube holders are automatically oriented for reception of the bottom-sealed tubes and automatically oriented for placement of the top seals in proper relation to the previously formed bottom seals. Thus, for making tetrahedron-shaped packages, the tube holders carrying the bottom-sealed tubes are automatically oriented prior to the formation of the top seals for making the top seals at right angles to the bottom seals. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invention is illustrated, FIG. 1 is a schematic view illustrating the formation of individual tubes for making packages of this invention;

FIG. 2 is a schematic view illustrating the horizontal positioning of a tube above a pair of bottom sealing heads in accordance with the invention;

FIG. 3 is a schematic view illustrating the tube shown in FIG. 2 turned to vertical position with its lower end between the sealing heads;

FIG. 4 is a schematic view showing the sealing heads closed on the lower end of the tube to form a bottom seal;

FIG. 5 is a view showing the bottom sealing heads opened and the tube moved downward into a tube holder constituted by a can;

FIG. 6 is a view showing the filling of the tube in the can;

FIG. 7 is a view showing the can carrying the filled tube located below a pair of top sealing heads;

FIG. 8 is a view showing the can rotated on its axis to locate the bottom seal of the tube at right angles to the top sealing heads so that the top seal may be made at right angles to the bottom seal;

FIG. 15 is an enlarged fragment of FIG. 14 showing details of a can carriage of the bottom sealing unit;

FIG. 16 is a section on line 16—16 of FIG. 15;

FIG. 17 is a plan of a can elevator platform taken on line 17—17 of FIG. 16;

FIG. 18 is a view on line 18—18 of FIG. 17;

FIG. 21 is an enlarged fragment of FIG. 14 showing details of a suction cup rod mechanism;

FIG. 22 is a horizontal section on line 22—22 of FIG. 21;

FIG. 23 is a vertical section on line 23—23 of FIG. 22;

FIG. 24 is a plan of a plunger operating mechanism of the bottom sealing unit;

FIG. 25 is an elevation of FIG. 24 (and an enlarged fragment of FIG. 14) with parts broken away and sectioned;

FIG. 26 is a plan of a wedge on a plunger of the bottom sealing unit;

FIG. 27 is a section of the wedge on line 27—27 of FIG. 26;

FIG. 28 is a fragmentary view on line 28—28 of FIG. 27;

Corresponding reference characters indicate corresponding parts throughout the several views of the drawings.

Referring to FIGS. 1–10, which schematically illustrate the basic principles of the invention as it pertains to forming, filling and sealing tetrahedron-shaped packages, there is indicated at W in FIG. 1 a web of flexible packaging material which is heat-sealable on one face thereof as indicated at A. This web may consist, for example, of laminated paper and metal foil layers with a coating A of polyethylene on one face. It may be preprinted on its other face with label indicia recurring at package length intervals. In FIG. 1, the web is shown as being withdrawn from a supply roll R and segmented into individual rectangular blanks B by cutting it transversely at package length intervals (between the recurrent label indicia if such is present). Each such rectangular blank B is then formed into a tube T open at both ends with heat-sealable face A on the inside and with a heat-sealed longitudinal tube seam such as indicated at LS. This seam may be of the inside-face-to-inside-face type described in U.S. Patent 2,942,760, and may be folded over on the outside of the tube as appears at the extreme right of FIG. 1.

Each tube T, formed as illustrated in FIG. 1, is transferred while in horizontal position to a bottom sealing unit, in which it is at first horizontally positioned above a pair of horizontally arranged heat-sealing heads H1 and H2 as shown in FIG. 2. These heads are horizontally movable toward and away from one another between an open and a closed position.

In the bottom sealing unit, the tube T is turned from horizontal position to upright position as shown in FIG. 3. It is turned on a horizontal axis extending transversely across the tube at the center of length of the tube and intersecting the longitudinal axis of the tube. This brings the lower end of the tube between the sealing heads H1 and H2 (which are open).

Then, as shown in FIG. 4, the sealing heads H1 and H2 are closed to form a transverse heat seal (see FIGS. 5–10) across the lower end of the tube, closing the lower end of the tube, this bottom seal being designated BS.

After the sealing of the lower end of the tube T, the sealing heads 1 are opened and the tube T (with its bottom end sealed, but with its upper end unsealed and open) is positively carried downward between the opened sealing heads H1 and H2 into a tube holder which, as shown, is constituted by a can C having means therein for holding the tube in upright position (see FIG. 5). This transfer occurs in the bottom sealing unit. The upper (and open) end of the tube extends up above the top of the can. Prior to the transfer of the tube into the can C, the can is rotated to orient it in proper position for receiving the bottomed tube.

The can C with the tube T therein is then transferred to a filler, and is filled with a measured quantity of the product to be packaged in the tube, as illustrated in FIG. 6.

Figure 9:
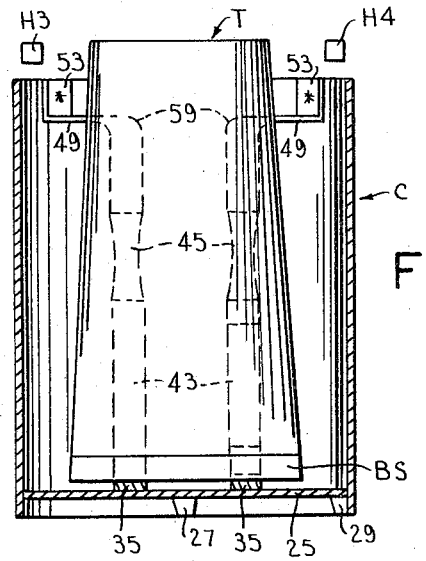
FIG. 9 is a view showing the can raised to bring the upper end of the tube between the top sealing heads.
Figure 10:
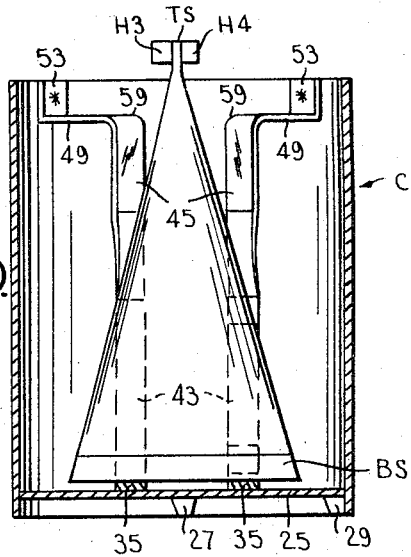
FIG. 10 is a view showing the top sealing heads closed on the upper end of the tube to form the top seal.
Figure 11:
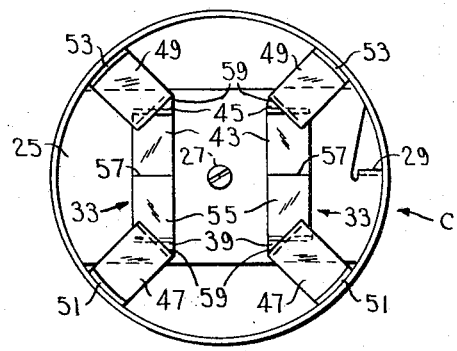
FIG. 11 is a plan of the can (without the tube)

Then, the can C with the filled tube T therein is transferred to a top sealing unit in which, at first, the upper end of the tube is positioned below a pair of horizontally arranged heat-sealing heads H3 and H4, as shown in FIG. 7. These heads are horizontally movable toward and away from one another between an open and a closed position and, initially, are open. At this stage of operations, the bottom seal BS previously made at the lower end of the tube may be indiscriminately positioned with respect to the heat-sealing heads H3 and H4 (note that botom seal BS needs to be at right angles to the heads H3 and H4 for forming a top seal at right angles to the bottom seal in order to form a tetrahedron-shaped package). Accordingly, the can C and the tube T therein are rotated on a vertical axis to orient the tube with the bottom seal BS at right angles to the heads H3 and H4 as shown in FIG. 8. Then, the holder and the tube therein are raised to bring the upper end of the tube between the heads H3 and H4, as shown in FIG. 9, after which the heads H3 and H4 are closed on the upper end of the tube to form a transverse heat seal (see FIG. 10) across the upper end of the tube, closing the upper end of the tube and completing the formation of a tetrahedron-shaped package P. This top seal is designated TS. The heads H3 and H4 are opened, the package P is removed from the can C, and the can is returned (as will appear) to receive another tube to be carried through the sequence of operations as above described.

Figure 12:
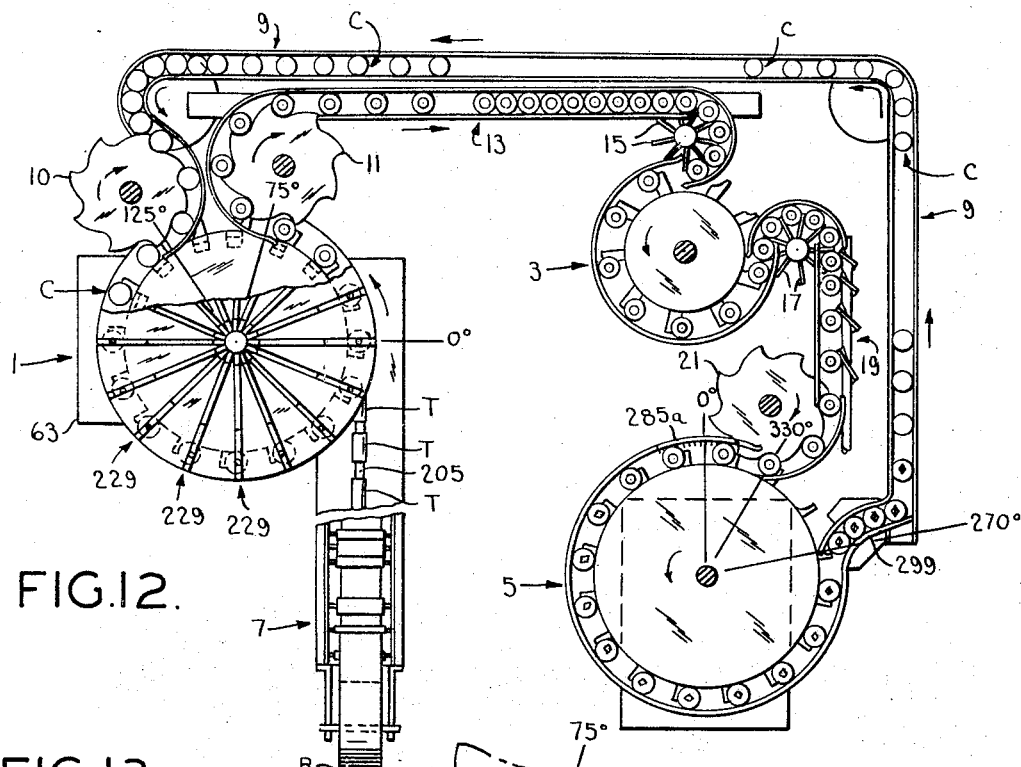
FIG. 12 is a plan of the apparatus, showing a bottom sealing unit, a filler and a top sealing unit.

Referring now to FIG. 12, the bottom sealing unit is generally indicated at 1, the filler at 3, and the top sealing unit at 5. Means for forming tubes T one after another and delivering them to the bottom sealing unit 1 is generally indicated at 7. This means may be generally identical to the tube-forming unit which is indicated at 100 in the aforesaid U.S. patent. The bottom sealing unit 1, the filler 3, and the top sealing unit 5 are each of the rotary turret type. Empty cans C are returned from the top sealing unit 5 to the bottom sealing unit 1 by conveyor means generally indicated at 9, and delivered from this conveyor means to the bottom sealing unit by a star wheel 10. Cans C having bottom-sealed tubes T therein are delivered from the bottom sealing unit 1 by a star wheel 11 to a conveyor means 13 which conveys them (in upright position) to a star wheel 15 for delivery to the filler 3. Cans C having the bottom-sealed filled tubes T therein are delivered from the filler 3 by a star wheel 17 to a conveyor means 19 which conveys them (in upright position) to a star wheel 21 for delivery to the top sealing unit 5.

Referring to FIGS. 5–11, each can C is shown as comprising a conventional tin can, such as a #2½ can, minus the can bottom and top. Extending across the can adjacent its bottom is a sheet metal plate or shelf 25, the ends of which are soldered to the cylindric wall of the can. At the center of this shelf there is provided a downwardly extending conical centering stud 27, located on the vertical axis of the can. The shelf has a downstruck tab 29 at one end thereof, located in a diametrical plane of the can, for a purpose which will appear. Within the can, above the shelf 25, is a cradle structure generally designated 31 for cradling and gripping a tube T having a bottom seal BS with the tube standing upright in the can and with the upper end of the tube extending out of the top of the can. This cradle structure comprises a pair of sheet metal strip assemblies each designated 33 (see FIG. 11) located on opposite sides of the diametrical plane of the can which is at right angles to the plane of the tab 29. Each assembly 33 comprises a strip of sheet metal bent to have a horizontal bottom portion 35 bearing on the shelf, along vertical leg 37 twisted at 39, a second leg having a short vertical lower portion 41, an inclined portion 43, and a twisted vertical upper portion 45. Extending laterally outward from the upper end of leg 37 and the upper end of upper portion 45 of the other leg are arms 47 and 49 which have upturned outer ends 51 and 53 soldered to the can at the top thereof. An inclined spring strip 55 soldered at its upper end to leg 37 and having a vertical clamping portion 57 at its lower end opposed to lower portion 41 of the other leg completes the assembly.

Portions 43 of the second legs and strips 55 of the cradle assemblies converge downward to an apex for cradling a bottom sealed tube T with its bottom seal BS generally in the plane of the tab 29. The corners 59 where arms 47 and 49 are bent out provide four points of lateral support for the tube T to hold it upright in the can.

Figure 14:
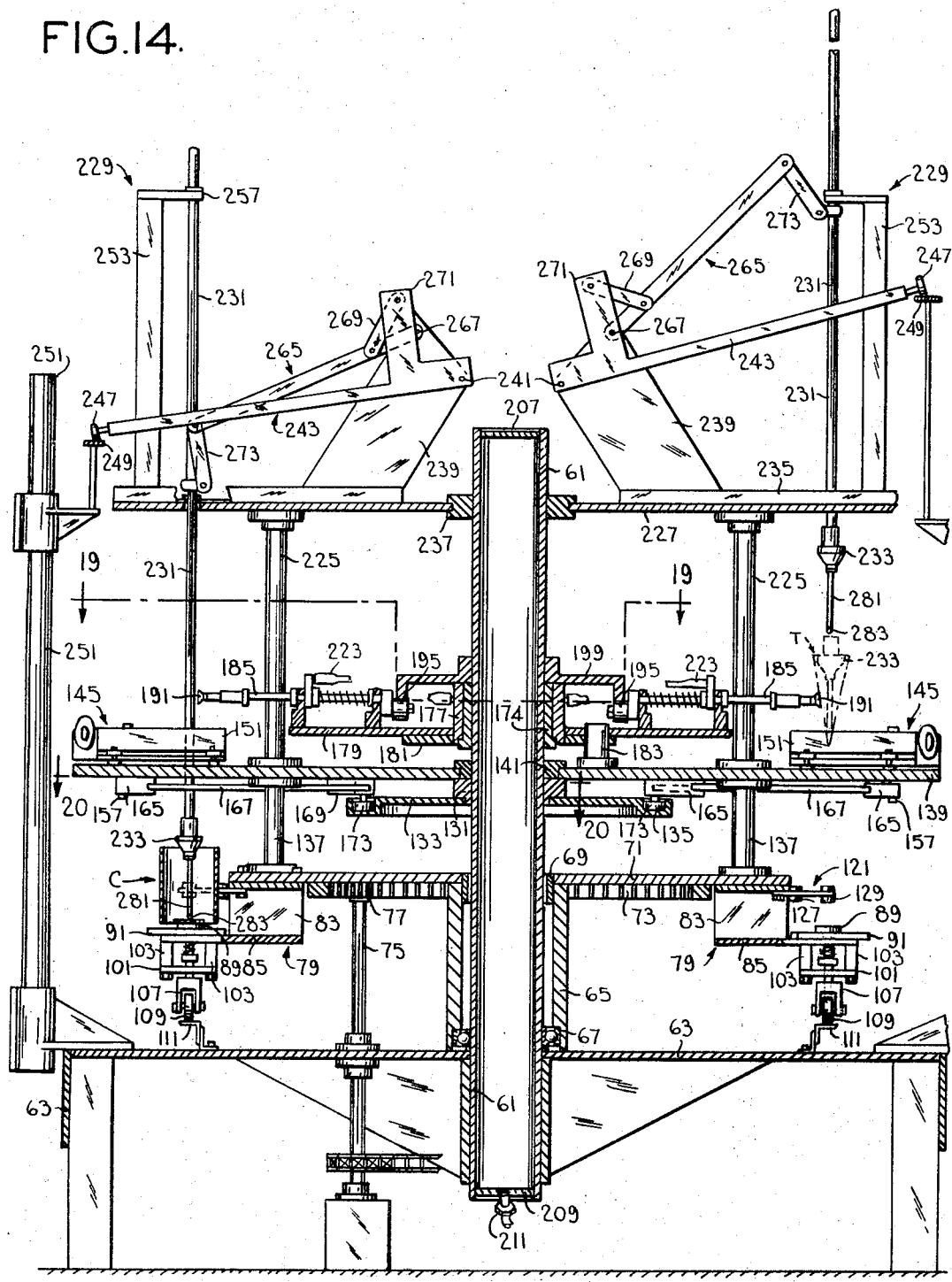
FIG. 14 is a vertical section of the bottom sealing unit.

Referring to FIG. 14, the bottom sealing unit 1 is shown to comprise a stationary vertical tubular center post 61 extending upward from a base 63. A quill 65 is rotatable on the post immediately above the base, a thrust bearing 67 being provided at the lower end of the quill and a sleeve bearing 69 being provided at the upper end of the quill. Fastened on the upper end of the quill is a circular horizontal turret plate 71. This carries on its bottom a ring gear 73. A drive shaft 75 extends up through the base and has a pinion 77 on its upper end in mesh with gear 73 for driving the plate 71. Radially outward of gear 73, plate 71 carries on its bottom a circular series of can carriages each generally designated 79. As herein illustrated there are sixteen such carriages spaced at 22½° intervals around the plate 71.

Each can carriage 79 (see particularly FIGS. 15 and 16) comprises a top plate 81 which is bolted to the bottom of plate 71, side plates 83 welded to the top plate and extending downward therefrom, and a bottom plate 85 welded to the bottoms of the side plates. The bottom plate 85 projects radially outward beyond the outer ends of side plates 83 (and beyond the rim of plate 71), and has an opening 86 located toward its radially outer end. Vertically slidable in this opening is a rod 87 having a circular platform 89 on its upper end. The rod and platform constitute an elevator for a can C. On the outer end portion of plate 85 is secured a table plate 91 having a circular opening 93 somewhat larger than the elevator platform 89. A coil compression spring 95 reacting from the bottom of plate 85 against a collar 97 on the rod biases the rod and the platform downward to a lowered position wherein the top surface of the platform is generally flush with the top surface of the table plate 91, determined by engagement of a downwardly extending central boss 99 on platform 89 with the top of plate 85. An auxiliary guide plate 101 for rod 87 is suspended below plate 85 as indicated at 103, having an opening 105 in line with opening 86 slidably receiving the rod. Secured to the lower end of the rod below plate 101 is a clevis 107 carrying a cam follower roller 109 which rides on a circular cam track 111 mounted on the base 63. A pin 113 extends up from the clevis through holes 115 and 116 in plates 101 and 85 for holding the rod and platform from turning on their vertical axis and for holding the cam follower roller in proper position on the cam track. The latter is developed for raising and lowering the can platforms as will appear. The upper end of each rod has a conical can-centering recess 117 for receiving the centering stud 27 of a can. Each platform has a lug 119 extending radially outward from its periphery adapted for engagement by the tab 29 of a can (see FIGS. 17 and 18). Extending out from under the top plate 81 of the carriage 79 is a can backstop 121 of L-shape in plan (see FIG. 13) having a side arm 123 and a rear arm 125, and provided with a roller 127 on the side arm and a roller 129 on the rear arm for engagement with a can C.

Figure 19:
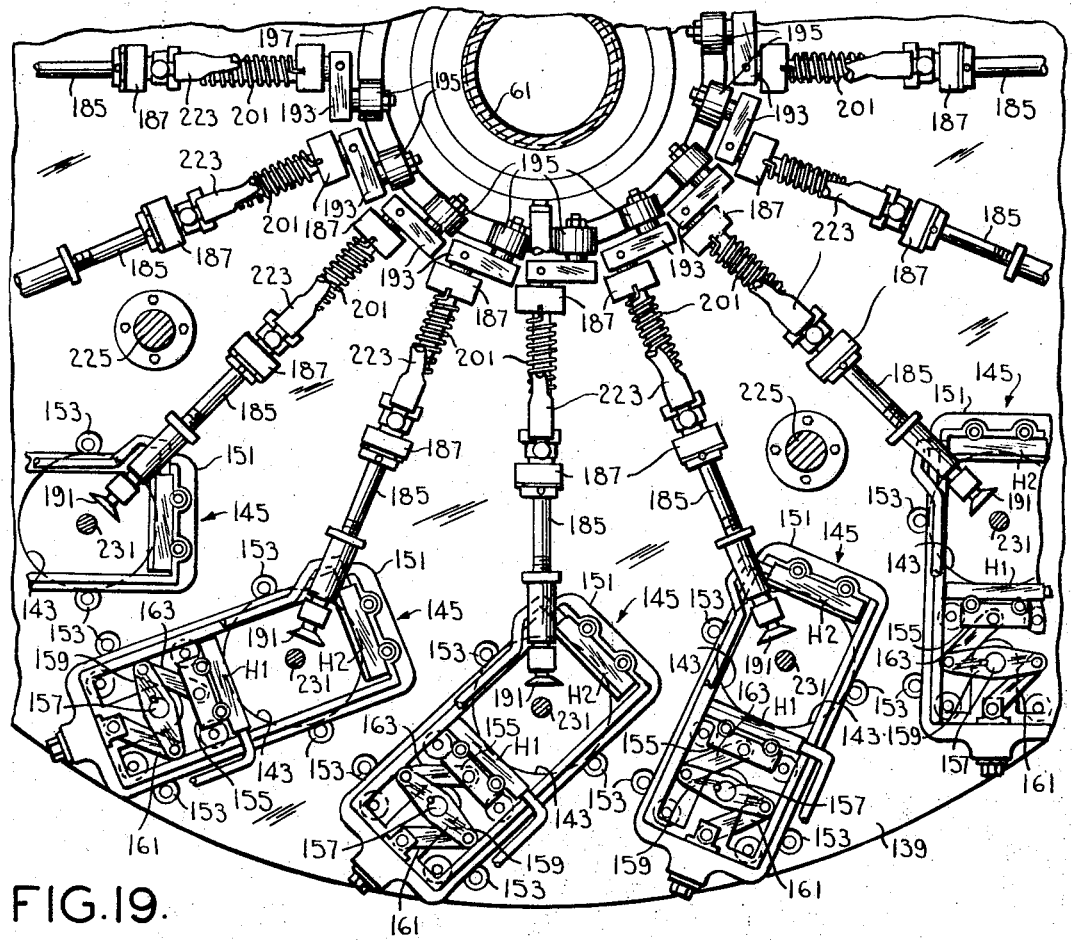
FIG. 19 is an enlarged fragmentary horizontal section taken on line 19—19 of FIG. 14.

Secured to the center post above the upper end of the quill is a collar 131 (see FIG. 14). Fastened to the bottom of this collar is a plate cam 133 having an upwardly opening cam groove 135 around its periphery. Extending up from plate 71 radially outward of cam plate 133 are posts 137 which support a second circular horizontal turret plate 139 for rotation with plate 71 at an elevation above the cam plate 133. Plate 139 has a center hole receiving a ring 141 surrounding post and secured to the top of collar 131. It is of such radius as to project outward beyond cam plate 133 over the circular can platforms 89. As herein illustrated, plate 139 has sixteen openings such as indicated at 143 in FIG. 19, each large enough for passage of a tube T, each of these openings being vertically aligned with a respective can platform 89. On top of plate 139, at each of these openings, is a heat-sealing unit 145 (there being sixteen of these units). Each unit 145 includes a pair of heat-sealing heads H1 and H2 such as previously mentioned for heat-sealing the lower ends of tubes T. Each unit 145 comprises an open rectangular frame 151 guided for reciprocation endwise of the frame on top of plate 139 by rollers 153. This reciprocation is along a horizontal line in a vertical plane intersecting the center of the respective opening 143 and lying at a 45° angle to the radial plane intersecting the center of the respective opening 143. The head of jaw H1 is carried by a carriage 155 which is mounted in the frame for sliding movement relative to the frame endwise of the frame.

Figure 20:
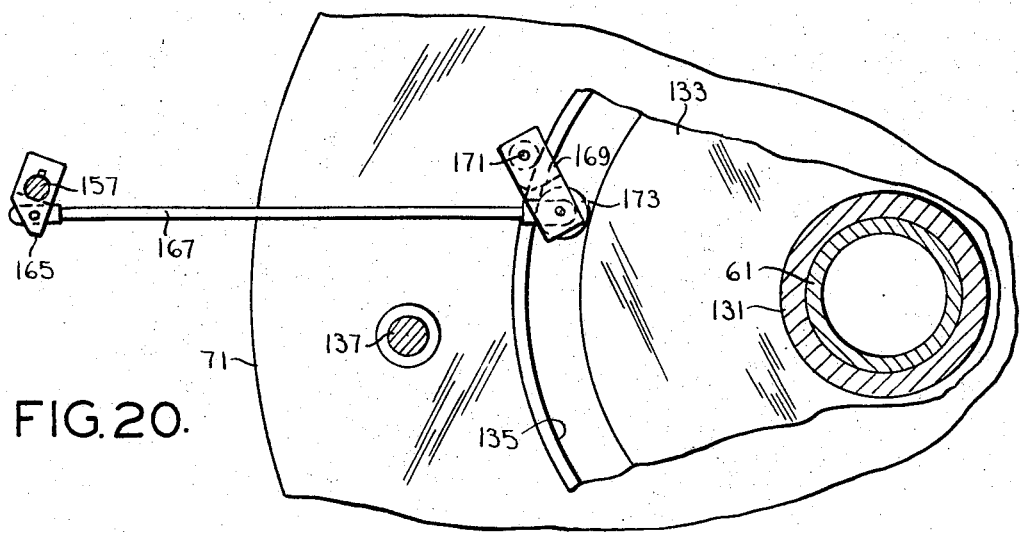
FIG. 20 is an enlarged fragmentary section taken on line 20—20 of FIG. 14.

As to each unit 145, a shaft 157 journalled in a hole in plate 139 has a lever 159 secured on its upper end. A link 161 connects one end of the lever to the frame and a link 163 connects the other end of the lever to the carriage. The arrangement is such that on rotation of shaft 157 in one direction, the frame 151 is pushed out and the carriage pushed in to close the heads H1 and H2, and on rotation of the shaft in the opposite direction, the frame is pulled in and the carriage is pulled out to open the heads. Shaft 157 has a crank 165 on its lower end below plate 139 (see FIG. 20). A link 167 connects the crank 165 to a cam follower lever 169 pivoted at 171 below the plate 139 carrying a cam follower roller 173 which tracks in the groove 135 of cam plate 133.

The above-described heat-sealing units 145 are essentially similar to those shown at 601 in the aforesaid copending coassigned Patent No. 3,236,021, and reference may be made thereto for further detail of the units 145 and their operating mechanism.

A collar 174 (see FIGS. 14, 21 and 23) is fastened on post above the plate 139. This has a flange 175 at its lower end rotatably supporting a hub 177. A circular plate 179 is supported on a flange 181 fastened to the lower end of the hub. A pin 183 extends up from plate 139 through a hole in the flange 181 and plate 179 to key them to plate 139 for rotation therewith. Plate 179 carries sixteen tube gripping and turning rods 185. These rods 185 extend horizontally radially outward beyond the rim of plate 179, spaced at 22½° intervals around the center post. Each rod is journalled for rotation on its longitudinal axis in a pair of bearing blocks 187 mounted on plate 179. Each rod has an axial vacuum passage 189 communicating with a rubber suction cup 191 on its outer end. Each rod has a crank 193 on its inner end carrying a cam follower roll 195 engageable with a cylindric cam formation 197 on an end cam 199 secured on the upper end of collar 173. Each rod is biased to rotate in the direction for maintaining the roll 195 in engagement with the cam formation 197 by a torsion spring 201 surrounding the portion of the rod between the bearing blocks 187 having one end secured to one of the blocks 187 and its other end secured to a collar 203 on the rod.

The centers of the openings 143 in plate 139 lie on a circle centered in the vertical axis of post 61, and the centers of platforms 89 lie on a circle of the same radius centered in the axis of the post. The suction cups 191 lie on a circle having a slightly smaller radius at the elevation of the tube-forming means 7. The latter comprises a horizontal cantilevered mandrel 205 (see FIG. 13) around which the tubes T are formed and fed endwise one after another in spaced-apart relation to a 0° take-off position at the free end of the mandrel. The mandrel extends tangentially to the circle on which the suction cups lie. As each rod 185, rotating counterclockwise around the axis of the center post as viewed from above, comes around to the 0° position, the suction cup 191 on the end of the rod engages and presses against a tube T which in the meantime has arrived at the 0° position at the end of the mandrel and the tube T, which is in horizontal position, is vacuum-gripped to the end of the rod. As the rod continues its rotation, and continues on past the 0° position, it carries the tube off the end of the mandrel. Then the rod is turned 90° on its longitudinal axis by the action of cam formation 197 to turn the gripped tube from horizontal to upright position, and to maintain it in upright position for a predetermined interval. For drawing a vacuum in the suction cup, the center post 61 is constituted as a vacuum chamber by having closures 207 and 209 at its upper and lower ends, with a connecton 211 (see FIG. 14) thereto from a vacuum pump (not shown). The collar 174 has a vacuum-applying groove 213 (see FIG. 22) and a suction cup venting groove 215 in its periphery in the plane of the rods 185. Vacuum is applied to groove 213 from the center post via radial ports 217 in the post and collar. Groove 215 is vented to atmosphere via a vent passage 219 in the collar. Hub 177 has sixteen radial ports 221, one for each of the rods 185, spaced at 22½° intervals around the hub. Each port 221 has a connection to the vacuum passage 189 in a respective rod 185 via a vacuum hose 223. Vacuum-applying groove 213 extends for about 145° around the collar, its trailing end leading the 0° position by about 15° and its leading end being about 130° around counterclockwise from the 0° position (see FIG. 22). Venting groove 215 starts about 5° around clockwise from the leading end of groove 215 and extends about 192° around the periphery of the collar. The arrangement is such that, upon rotation of the hub on the collar, vacuum is drawn in each rod and the respective suction cup when the rod reaches a position trailing the 0° position by 15°, is maintained for 130° rotation of the rod past the 0° position, and then the suction cup is vented via groove 215 and vent passage 219.

Posts 225 extend up from plate 139 and support a third turret plate 227 for rotation along with plates 71 and 139 around the vertical axis of the center post 61. Mounted on plate 227 are sixteen plunger units, each generally designated 229 (see FIGS. 13, 14, 24 and 25). These units are spaced at 22½° intervals around plate 227, each being correlated with a respective suction cup 191, and each including a vertical reciprocable plunger 231 having a wedge member 233 adapted, on downward movement of the plunger, to enter the open upper end of an upright tube T gripped by a respective suction cup 191 and to carry the tube T downward and deposit it in a can C on the related platform 89. Each unit 229 comprises an angle-section base 235 mounted on plate 227 extending radially outward from near the center hole in plate 227, which hole receives the center post 61. A grooved collar 237 fixed on the center post centrally supports plate 227. Extending up from the base at its radially inner end is a plate 239. Pivoted at 241 on plate 239 is a lever generally designated 243 comprising two spaced arms 245. This lever extends outward from plate 239 in a radial plane of plate 227 and has a cam follower roll 247 at its outer end which rides on a stationary circular cam track 249 mounted on posts 251 extending upward from the base. This cam track is formed to cause lever 243 to swing up and down on its pivot 241 as the lever rotates around the vertical axis of center post 61 with turret plate 227. A post 253 extends up from base 235 adjacent its outer end. Arms 245 of lever 243 straddle this post and have spacers 255 on their inside which maintain them spaced from the post. A bracket 257 extends radially inward from the upper end of the post and has a vertical guide hole 259 for the plunger 231, the latter being vertically slidable in this hole, and in a bushed hole 261 in the base and a hole 263 in plate 227. A lever 265 is pivoted at 267 on the plate. This lever 265 extends outward from pivot 267 between arms 245 of lever 243, is connected adjacent its inner end by a link 269 to upward projections 271 of lever arms 245, and has its forward end connected by a link 273 to the plunger 231. The arrangement is such that, as each unit 229 rotates around with turret plate 227, its lever 243 is swung up and down by cam track 249, and acts through its link 269 to swing its lever 265 up and down to move its plunger 231 up and down. The wedge 233 at the lower end of each plunger is generally of frusto-conical shape, with a flat side 275 (see FIGS. 23 and 24), and has three radial slots 277 each containing a light spring wire 279 for lightly and releasably gripping the bottom-sealed tube. The plunger 231 has an extension 281 from the lower end of the wedge carrying a crosshead 283 (see FIGS. 24 and 25).

Figure 29:
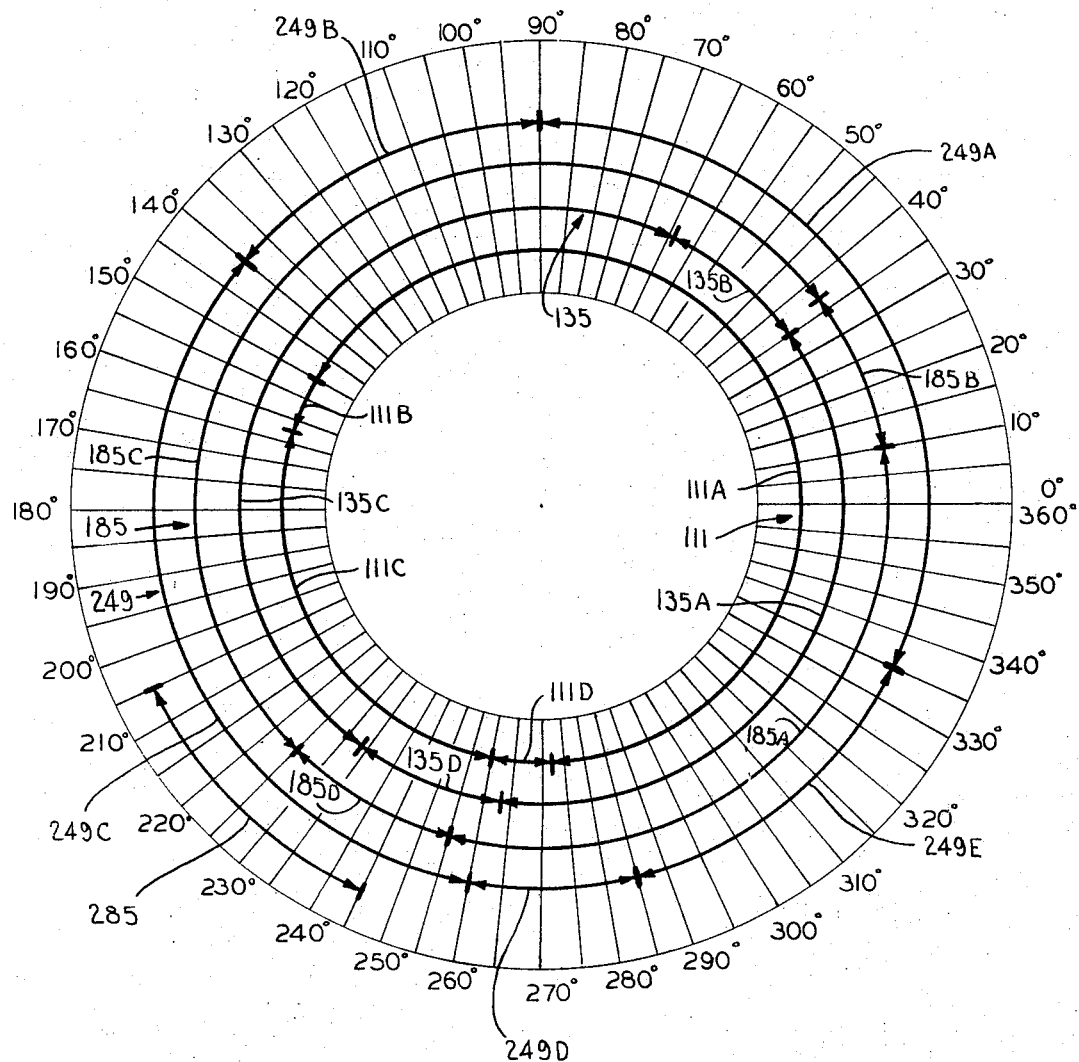
FIG. 29 is a cam diagram showing the development and phasing of the cams of the bottom sealing unit.

As diagrammed in FIG. 29, the cam track 111 which controls the rise and fall of the can platforms 89 is developed and phased to have a low horizontal dwell 111A which extends from 272° position around and through the 0° position to the 150° position, a rise 111B from the 150° position to the 162° position, a high horizontal dwell 111C from the 162° position to the 260° position, and a fall 111D from the 260° position to the 272° position. Accordingly, as the can platforms 89 rotate with plate 71 (counterclockwise as viewed in FIGS. 12 and 13), each platform occupies its lowered position in which its top surface is generally flush with the top surface of table plate 91 from the 272° position through the 0° position around to the 150° position, then it rises (about three-eights inch, for example) as it travels from the 150° position to the 162° position so that its top surface is above the top surface of table plate 91 (as shown in FIGS. 15 and 16) and dwells in raised position from the 162° position to the 260° position, and then returns to its lowered position as it travels from the 260° position to the 272° position.

The cam groove 135 of cam plate 133 which controls the operation of the heat-sealing units 145 is developed and phased to have a dwell section 135A for maintaining the heat-sealing heads H1 and H2 of each unit 145 open as each unit 145 rotates from the 263° position through the 0° position to the 35° position, a section 135B for effecting closure of the heads H1 and H2 of each unit 145 as it rotates from the 35° position to the 64° position, a dwell 135C for maintaining the heads H1 and H2 of each unit 145 closed as it rotates from the 64° position to the 234° position, and a section 135D for opening the heads H1 and H2 of each unit 145 as it rotates from the 234° position to the 263° position.

The cam 199 which controls the turning of suction cup rods 185 is developed and phased to have a dwell section 185A for maintaining each rod 185 in an initial angular position (about the rod axis) as each rod 185 rotates around the vertical axis of center post 61 from the 255° position through the 0° position to the 10° position, a section 185B for turning each rod 90° on its axis as it rotates around from the 10° position to the 37° position, a dwell section 185C for maintaining each rod in its turned position from the 37° position to the 225° position, and a section 185D for turning each rod back to its initial angular position as it rotates from the 225° position to the 255° position.

The cam track 249 which controls the rise and fall of the plungers 231 is developed and phased to have a dwell section 249A for maintaining each plunger 231 raised as it rotates from the 335° position through the 0° position to the 90° position, a section 249B for lowering each plunger to an intermediate position as the plunger rotates from the 90° position to the 140° position, a dwell section 249C for maintaining each plunger in the stated intermediate position as the plunger rotates from the 140° position to the 260° position, a section 249D for further lowering each plunger to a fully lowered position as it rotates from the 260° position to the 285° position, and a section 249E for fully raising each plunger as it rotates from the 285° position to the 335° position.

Figure 13:
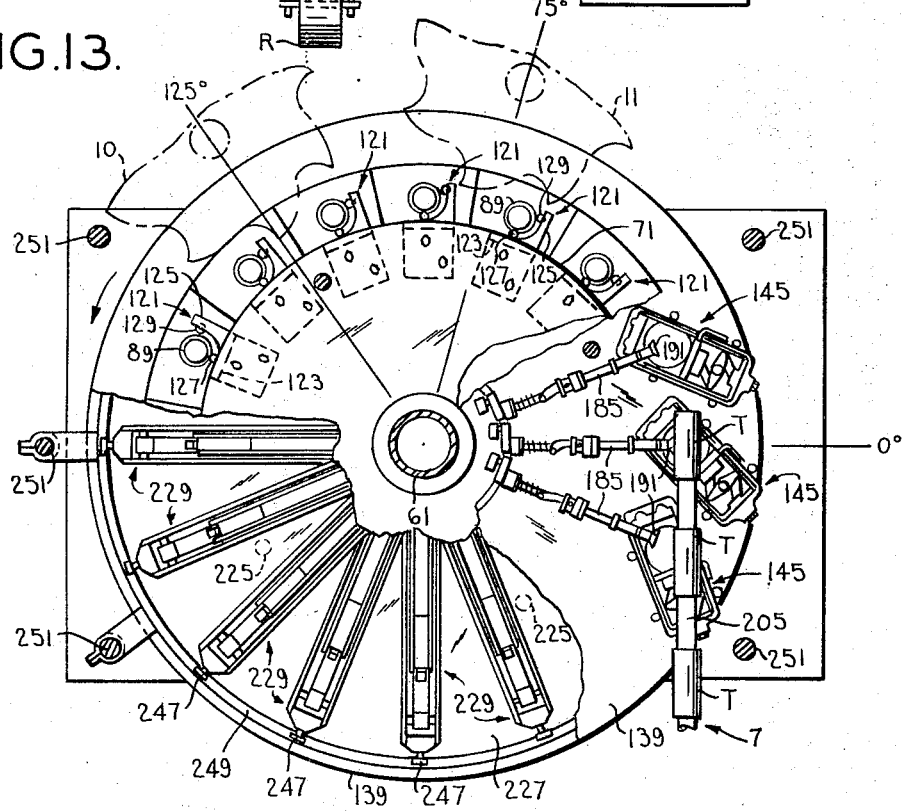
FIG. 13 is a plan of the bottom sealing unit with parts broken away.

As appears in FIGS. 12 and 13, the star wheel 10 pushes cans C one after another into the bottom sealer unit 1 approximately at the 125° position. The operation of the star wheel 10 is timed to deliver a can C onto the table plate 91 of a can transport unit 79 in front of the rear arm 125 of the can backstop 121 of the can transport unit. The elevator platform 89 of each can transport unit is in its lowered position as the transport unit arrives at the 125° position so that the can may be delivered onto the table plate 91 into position above the platform 89. The can slides onto the table plate into position in front of the backstop arm 125. Once the can has been delivered onto table plate 91 above the arm 125, it becomes centered on the table plate above the elevator platform by the rollers 127 and 129 of the can backstop (see FIG. 13). The bottom rim of the can bears on the table plate surrounding the circular opening 93 in the table plate.

Figure 30:
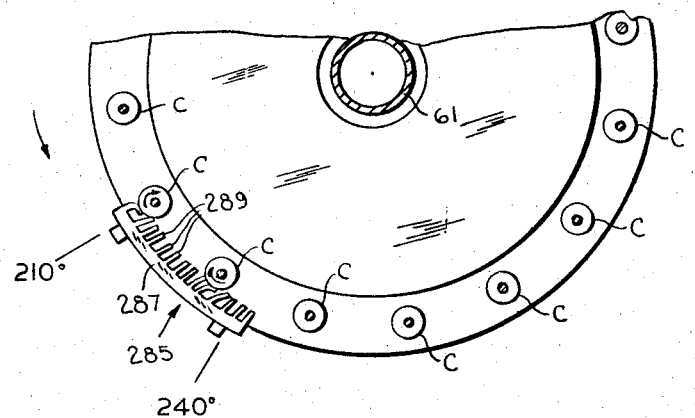
FIG. 30 is a view showing a brush for rotating cans in the bottom sealing unit.

A can C is thus delivered onto table plate 91 of each transport unit 79 and centered over the lowered platform 89 of unit 79 just before the unit 79 reaches the 150° position. At the 150° position, the platform 89 starts rising, and engages the shelf 25 at the bottom of the can to lift the can up off the table plate 91. The stud 27 which extends down from the can shelf 25 on the vertical central axis of the can interengages in the central recess 117 of the platform 89 to establish a vertical turning axis for the can. As the can C on the raised platform proceeds around, its outer side wipes along a friction brush device 285 (see FIG. 30) which causes the can to rotate on its vertical axis to the point where tab 29 which extends down from the shelf of the can strikes the lug 119 on the platform. This properly orients the can for later receiving a bottom-sealed tube T, as will appear. The friction brush, which is mounted in stationary position on the base 63, comprises a member 287 extending in an arc just outward of the circular path of travel of the outsides of the cans, and carrying elastic fingers 289 (e.g., rubber fingers) engageable by the cans to cause the cans to rotate on their vertical axes. The friction brush, as shown in FIGS. 26 and 27, extends from about the 210° position to the 240° position. The wiping of the cans along the fingers of the brush causes the cans to rotate clockwise on their vertical axes.

With regard to the orientation or registration of the cans C by the friction brush device 285, lug 119 on each platform 89 is located in a vertical plane lying parallel to (and midway between) the vertical planes of the sealing faces of the heads H1 and H2 of the respective heat-sealing unit 145. The tab 29 which extends down at one end of the shelf 25 of the can has one face thereof generally in the same vertical plane as the apex of the cradle structure in the can constituted by portions 41 and 57 thereof. Accordingly, when the can is rotated by the brush action to the point where tab 29 engages the lug 119 (which constitutes a locating stop), the apex of the cradle structure is oriented in a vertical plane parallel to (and midway between) the vertical planes of the sealing faces of the heads H1 and H2 (see FIG. 5). This positions the can for reception of a tube T after the bottom seal BS has been formed on the tube by the heads H1 and H2.

As previously pointed out, each suction cup 191, coming around to the 0° position, vacuum-grips a tube T which has arrived at the end of the mandrel 205, and carries the tube T in horizontal position off the end of the mandrel. As each suction cup rod 185 travels around from the 10° position to the 37° position, it is turned 90° to turn the tube T (gripped by the suction cup at the outer end of the rod 185) to vertical position. This brings the lower end of the tube between the heat-sealing heads H1 and H2 of the respective heat-sealing unit 145. These heads start closing at the 35° position (slightly before the turning of the tube is completed), and complete their closing motion at the 64° position to form the bottom seal BS on the tube (remaining closed around to the 234° position). At the 90° position, the respective plunger 231 starts moving down and at the 140° position completes its downward movement to its above-noted intermediate position about half-way down. This enters the wedge 233 in the open upper end of tube T (the lower end of which is at this time clamped between the heads H1 and H2), as indicated in phantom at the right side of FIG. 14. At the 260° position, the plunger 231 starts descending to its fully lowered position, carrying the tube T (now formed with bottom seal BS) along with it. The can C below has now been oriented, as previously described, and the tube T (wedged on the wedge 233) is carried down by the plunger and placed in the can, the bottom seal BS of the tube becoming clamped between the lower ends 57 of the spring clamp fingers 55 and portions 41 of the cradle structure in the can. The plunger is moved back upward to its fully raised position in rotating from the 285° position to the 335° position, and this withdraws the wedge 233 from the upper end of tube T, the bottom seal BS of the tube being clamped between 55 and 41 sufficiently to resist the tube being pulled back up by the wedge. The can C, having had a bottom-sealed tube T deposited therein, finally reaches the 75° position, where it is pushed out of the bottom sealer unit 1 by the star wheel 11 (the can platform 89 being lowered at this position). Thus, a can C is fed into the bottom sealer unit 1 at the 125° position and travels around through the 0° position at the 75° position where it is fed out of the bottom sealer unit by star wheel 11. As it travels around, it is raised (in the 150°–162° sector), oriented (in the 210°–240° sector), and receives a bottom-sealed tube T (at 285°) before it is fed out by the star wheel 11.

Star wheel 11 feeds the cans C each containing a bottom-sealed tube T one after another to the conveyor 13, which conveys them to star wheel 15 for delivery to the filler 3. The latter may be a standard filler of the rotary piston type, such as a filler sold by Pfaudler Company, Division of Pfaudler Permutit, Inc., of Rochester, N.Y., of the type shown in U.S. Patents 2,666,564, 2,725,169 and 2,759,649. The cans C carrying the bottom-sealed tubes T are fed through this filler, in which the tubes T are filled through their open upper ends. They may be filled with liquid, semiliquid, powdered or granular material, etc. Star wheel 17 feeds the cans having the filled bottom-sealed tubes T therein out of the filler on to conveyor 19 which conveys them to star wheel 21 for delivery to the top sealing unit 5.

Figure 32:
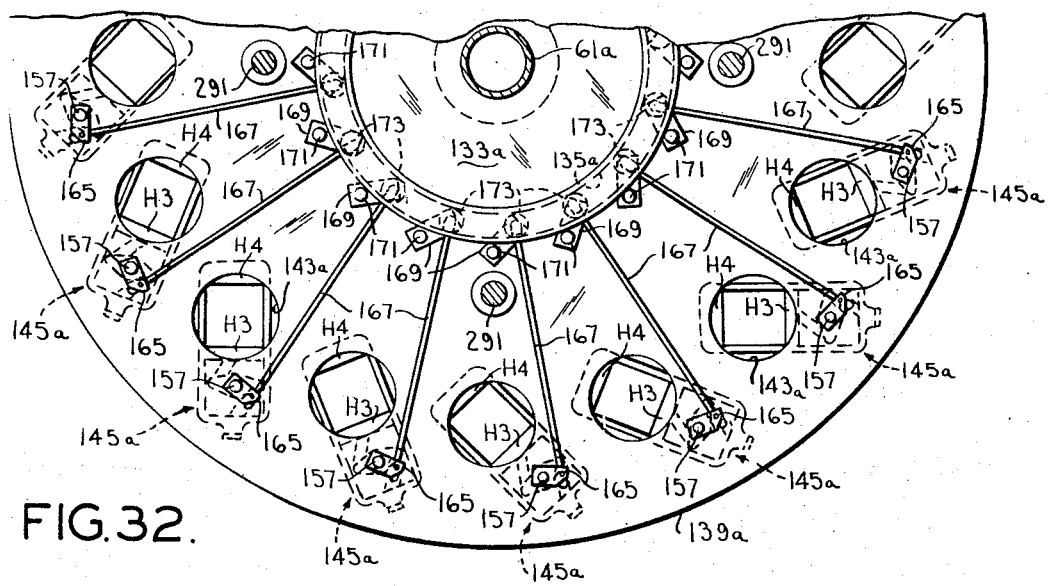
FIG. 32 is a horizontal section on line 32—32 of FIG. 31.
Figure 31:
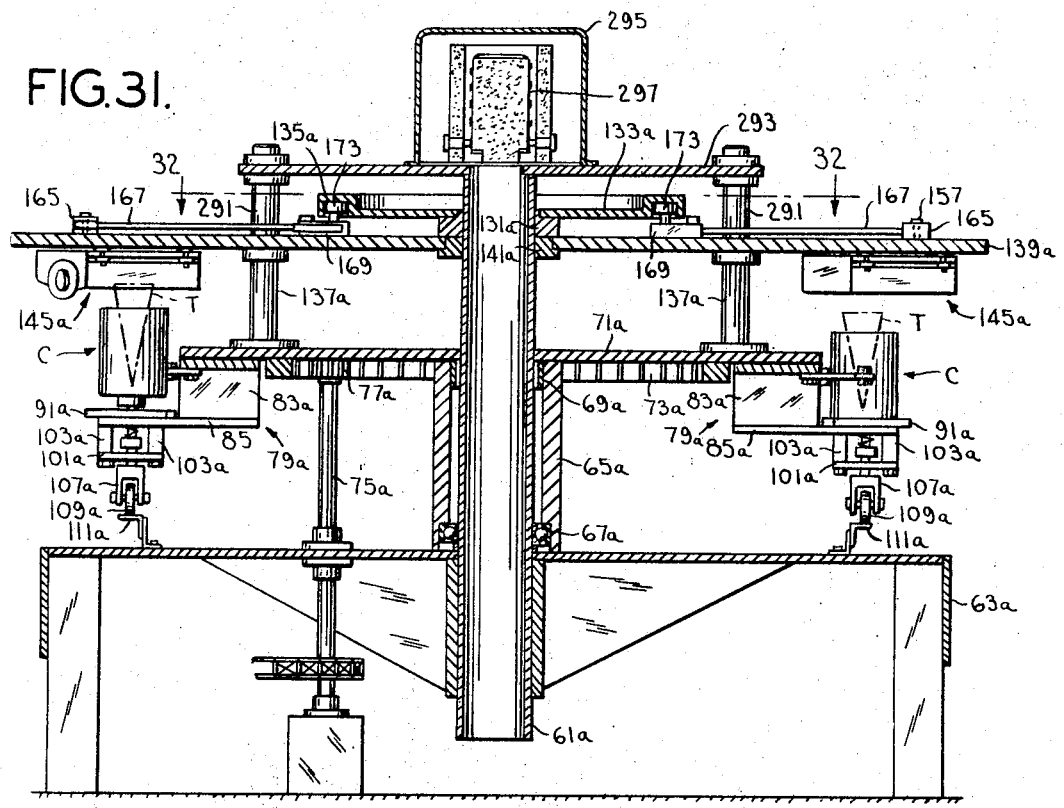
FIG. 31 is a vertical section of the top sealing unit.

The top sealing unit 5 (see FIGS. 31 and 32) is similar to the bottom sealing unit in comprising a stationary vertical center post 61a extending upward from a base 63a. A quill 65a is rotatable on the post immediately above the base, a thrust bearing 67a being provided at the lower end of the quill and a sleeve bearing 69a being provided at the upper end of the quill. Fastened on the upper end of the quill is a circular horizontal turret plate 71a. This carries on its bottom a ring gear 73a. A drive shaft 75a extends up through the base 63a and has a pinion 77a on its upper end in mesh with gear 73a for driving plate 71a. Radially outward of gear 73a, plate 71a carries on its bottom a circular series of can transport units 79a each generally identical to can transport units 79 previously described. As herein illustrated, there would be sixteen such units spaced at 22½° intervals around the plate 71a. The cam track for cam follower rollers 109 of units 79a is designated 111a.

Extending up from plate 71a are posts 137a which support a second circular horizontal turret plate 139a above plate 71a for rotation with the latter. Plate 139a carriers sixteen heat-sealing units 145a on its bottom spaced at 22½° intervals, one for each can transport unit 79a. Units 145a are identical to units 145 previously described, each including a pair of the heat-sealing heads H3 and H4 previously referred to for top-sealing the tubes T. They are actuated by linkages similar to those for actuating units 145 worked by a cam plate 133a secured to the center post 61a having a downwardly opening cam groove 135a. Heat-sealing units 145a of the top-sealing unit 5 are arranged at right angles to their counterparts 145 of the bottom-sealing unit 1 (compare FIGS. 28 and 19) for forming the top seals TS at right angles to the bottom seals BS. Posts 291 extending up from plate 139a support a third plate 293 which carriers a housing 295 for a slip-ring assembly 297 for supplying current to heat-sealing heads H3 and H4.

The 0° position of the can transport units 79a and the heat-sealing units 145a of the top-sealing unit 5 is represented as extending vertically upward in FIG. 12. As diagrammed in FIG. 33, the cam track 111a which controls the rise and fall of can platforms 89 of the can transport units 79a of the top-sealing unit 5 is developed and phased to have a horizontal low dwell section 111a–A which extends from the 255° position around to the 340° position, a rise 111a–B extending from the 340° position through the 0° position to the 25° position, a high horizontal dwell section 111a–C extending from the 25° position around to the 235° position, and a fall 111a–D extending from the 235° position to the 270° position. Cam groove 135a of cam plate 133a which controls the operation of the heat-sealing units 145a of the top-sealing unit 5 is developed and phased to have a dwell section 135a–A for maintaining the heat-sealing heads H3 and H4 of each unit 145a open as each unit 145a rotates from the 243° position through 0° position to the 16° position, a section 135a–B for effecting closure of the heads H3 and H4 as each unit 145a rotates from the 16° position to the 45° position, a dwell section 135a–C for maintaining the heads H3 and H4 of each unit 145a closed as it rotates from the 45° position to the 215° position, and a section 135a–D for opening the heads H3 and H4 of each unit 145 as it rotates from the 215° position to the 243° position.

Figure 33:
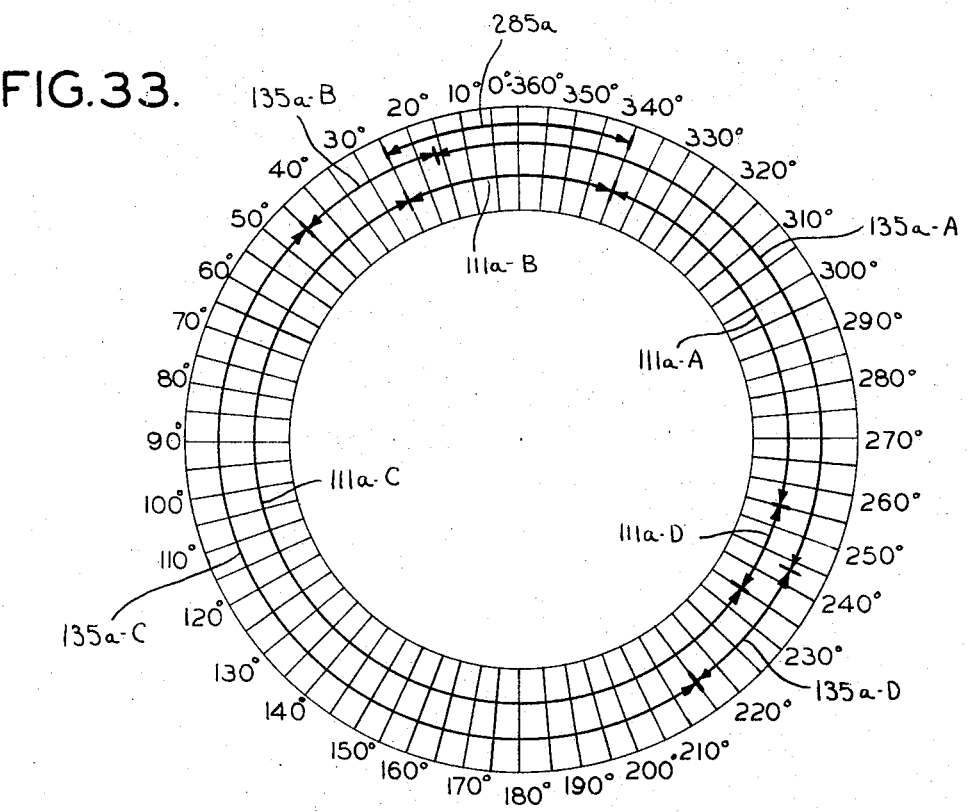
FIG. 33 is a cam diagram showing the development and phasing of the cams of the top sealing unit.

As appears in FIGS. 12 and 33, the star wheel 21 pushes cans C one after another into the top-sealing unit 5 approximately at the 330° position, and cans exit from unit 5 via an exit guide-way 299 at approximately the 270° position. A can-rotating brush 285a, similar to brush 285, extends in an arc from the 340° position through the 0° position to the 25° position.

In the top-sealing unit, the elevation of plate 139a is such in relation to the can carriages 79a that, with a can C on the table plate 91 of a carriage 79a, the respective platform 89 being lowered, the top of the tube T in the can is below the respective heat-sealing unit 145a. When the platform 89 is raised by the action of track 111a, the top of the tube T is raised to a position between the sealing heads H3 and H4 of the heat-sealing unit 145a, in the manner illustrated in FIG. 9. At the 330° position, the can platforms of carriages 79a are lowered so that cans may feed onto the table plates, the tops of the tubes T in the cans passing under the heat-sealing units 145a. Then, in the range from the 340° to the 25° position, each platform rises to raise the can with the tube T therein to position the top of the tube between the sealing heads H3 and H4 of the respective heat-sealing unit 145a. When the cans are raised, brush 285a functions to orient them before heads H3 and H4 are fully closed. Lugs 119 of the can platforms of the top-sealing unit are located at right angles to their counterparts in the bottom-sealing unit for orientation of the bottom seal BS of a tube at right angles to heads H3 and H4 as shown in FIG. 9 for formation of the top seal TS at right angles to the bottom seal BS for formation of a package in the shape of a tetrahedron.

Operation of the apparatus illustrated in FIGS. 12–33 is as follows:

The bottom-sealing unit 1, the filler 3, the top-sealing unit 5, the conveyors 9, 13 and 19, and the star wheels 10, 11, 15, 17 and 21 are continuously driven from a common drive (details of which are not shown) so that their speeds are properly correlated. The turret structure of the bottom-sealing unit (which comprises turret plates 71, 139, 179 and 227) rotates continuously in counterclockwise direction as viewed from above. The turret of filler 3 rotates continuously in counterclockwise direction as viewed from above. The turret structure of the top-sealing unit (which comprises turret plates 71a and 139a) rotates continuously in clockwise direction as viewed from above.

Considering the operations which take place with respect to each one of the tubes T formed by the tube-forming means 7 and fed endwise to the bottom-sealing unit 1 on the mandrel 205, the tube reaches the 0° position of the bottom-sealing unit at the time that a suction cup 191 on one of the suction cup rods 185 reaches the 0° position. This suction cup presses against the tube on the mandrel and, since a vacuum is being drawn in the suction cup at the 0° position, the tube is gripped to the suction cup on the end of the rod. Note in this respect, that vacuum is applied to each suction cup throughout the range of vacuum-applying groove 213 in collar 174, this groove extending around from the 345° position through the 0° position to the 130° position (see FIG. 22). Accordingly, the suction cup rod 185 carries the tube off the free end of the mandrel and the tube starts off on a circular path of travel in the bottom-sealing unit.

The rod 185 carries the tube T off the free end of mandrel 205 with the tube in horizontal position. At the 10° position, the rod 185 starts turning on its axis under the action of the cam 199 and, at the 37° position, the rod completes a 90° turn on its axis. This brings the tube T to vertical position with its lower end between the heat-sealing heads H1 and H2 of the heat-sealing unit 145 which is associated with rod 185 carrying the tube. This corresponds to FIG. 3.

At the 35° position, the heads H1 and H2 start to close under the action of cam groove 135, and at 64° they are completely closed on the lower end of the tube T. They remain closed around to the 234° position, thereby to form the bottom seal BS for the tube, and then open in the range from the 234° position to the 263° position.

While the heads H1 and H2 are clamped on the lower end of the stated tube T and forming the bottom seal BS, the respective plunger 231 is lowered by the descent of the associated cam follower roller 247 on the fall 249B of cam track 249 to its intermediate position, thereby entering the wedge 233 on the plunger in the tube T through the open upper end of the tube. This action is completed at the 140° position. The plunger 231 dwells in its intermediate position with wedge 233 entered in the tube around to the 260° position. Then, it is moved farther downward to its fully lowered position by the descent of the cam follower roller 247 on the fall 249D of the cam track 249. At this time the heads H1 and H2 are open (their opening movement having been completed at the 263° position), and the wedge 233 carries the bottom-sealed tube T downward and deposits it in can C which is travelling around on the can carriage 79 associated with the stated plunger and wedge.

The can C in which the bottom-sealed tube T is deposited as described in the previous paragraph is on the stated can carriage 79 in position to receive the tube as a result of delivery of the can by the star wheel 10 from conveyor 9 to the can carriage at the 125° position, and the subsequent turning of the can on its axis by the friction brush 285 in the range from the 210° to the 240° position. In this respect, it will be recalled that when the can is delivered by the star wheel 10 on to the table plate 91 of the can carriage, the can elevator platform 89 is in its lowered retracted position flush with or slightly below the top surface of the table plate. This permits the can to be slid on to the table plate by the star wheel in front of the rear arm 125 of the can backstop 123. Then the can is centered over the platform 89 by the rollers 127 and 129 on the backstop. At the 150° position, the platform starts to rise under the action of cam track 111 and completes its rise at the 162° position. This lifts the can off the table plate, and enables the center stud 27 on the shelf 25 at the bottom of the can to enter the recess 117 in the platform. The can is thereupon capable of turning on its vertical axis, and, as it passes from the 210° position to the 240° position it wipes against the brush 285, which causes the can to rotate clockwise on its vertical axis (see FIG. 30). The can rotates to the point where the tab 29 on the can strikes the stop lug 119 on the platform, and this effects registration of the apex 41, 57 of the cradle structure in the can with the bottom seal BS of the tube T. All this has occurred prior to the downward delivery of the tube T into the can by the plunger 231 and wedge 233.

As the bottom-sealed tube T is deposited in the can C by the downward movement of the plunger 231 and wedge 233, the bottom seal BS of the tube is entered between the lower ends 57 of the spring clamp fingers 55 and portions 41 of the cradle structure of the can so as to become clamped therebetween. This is assisted by the crosshead 283 at the lower end of plunger extension 281.

The deposit of the bottom-sealed tube T in the can is completed at the 285° position. The plunger 231 and wedge 233 then start rising under the action of cam track 249 back to their fully raised position. This return motion of the plunger and wedge is completed at the 335° position. Since the bottom seal BS of the tube T is clamped by fingers 47 against portions 41 of the can cradle structure, the tube T is retained in the can, the wedge 233 pulling out of the tube. The can with the tube T therein then proceeds on through the 0° position to the 75° position where it is fed out of the bottom-sealing unit 1 by the star wheel 11. The latter functions to slide the can off the table plate 91 and on to conveyor 13, as permitted by the can platform 89 having been previously lowered by cam track 111 in passing through the range from the 260° position to the 272° position, and remaining lowered around to the 150° position.

The can C with the bottom-sealed tube T therein is then transported by conveyor 13 to star wheel 15 which feeds it into the filler 3. The tube T held in the can is filled through its open upper end as it is carried around in the filler. After the tube has been filled, star wheel 17 feeds the can carrying the tube to conveyor 19. The latter transports it to star wheel 21, which feeds it into the top-sealing unit 5.

When the can C is fed into the top-sealing unit 5, it slides on to the table plate 91 of a can carriage 79a of the top-sealing unit traveling past the 330° position. The can elevator platform 89 of this can carriage 79a is in its lowered retracted position flush with or slightly below the top surface of the table plate at the 330° position (noting that the cam follower roller 109 of the carriage 79a is on low dwell section 111a–A of cam track 111a). At the 340° position, the platform 89 rises and engages the shelf 25 at the bottom of the can C to lift the can up off the table plate (the action being the same as in the bottom-sealing unit). The stud 27 of the can engages in the recess 117 of the platform 89 to establish a vertical turning axis for the can. As the can C on the raised platform proceeds around, its outer side wipes along the friction brush 285a of the top-sealing unit, which causes the can to rotate on its vertical axis to the point where tab 29 of the can strikes lug 119 of the platform 89 of can carriage 79a. In the top-sealing unit, lugs 119 of the can carriage 79a are located in a vertical plane at right angles to the vertical planes of the sealing faces of heads H3 and H4 of the heat-sealing units 145a. Accordingly, when the can is rotated in the top-sealing unit by the action of brush 285a to the point where tab 29 engages the lug 119, the bottom seal BS if positioned at right angles to the sealing heads H3 and H4 (as shown in FIG. 9). The rise of the can platform 89 has previously raised the can to bring the upper end of tube T therein between heads H3 and H4. At the 16° position, the heads H3 and H4 start closing under the action of cam groove 135a, at the 45° position they are completely closed, and they remain closed around to the 215° position, thereby to form the top seal TS. Heads H3 and H4 open in the range from the 215° to the 243° position. The can with the filled tube T therein now sealed at the bottom and the top is lowered in the range from the 235° to the 270° position to bring the top of the tube down from between the opened heads H3 and H4. Then, at the 270° position, the can with the filled and sealed tube T therein exits from the top-sealing unit via guideway 299 and is transferred to the conveyor 9 which carries the can back to the bottom-sealing unit. As the cans are returned by conveyor 9 to the bottom-sealing unit, the filled and sealed tubes may be manually taken out of the cans.

While, as above described, the apparatus is constructed to form packages of tetrahedron shape, it will be understood that it may be modified to make flat (pillow-shaped) packs or pounches by arranging the heat-sealing units 145a and lugs 119 of the top-sealing unit to make the top seals in the same plane as the bottom seals (instead of at right angles thereto).

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of forming, filling and sealing packages comprising forming flexible packaging material into open-ended tubes, closing one end of each tube, transferring each tube closed at its said one end to a holder in which the tube is positioned upright with its closed end down, filling each tube while held by its holder through its open upper end, and closing the upper end of each filled tube while held by its holder.

2. The method of claim 1 wherein each holder is positioned for closing the upper end of the filled tube held thereby in a plane at an angle to the closure at the lower end of the tube so that the package formed therefrom has the shape of a tetrahedron.

3. The method of forming, filling and sealing packages comprising forming flexible packaging material into a succession of individual open-ended tubes, conveying the tubes one after another along a predetermined path, closing one end of each tube as it proceeds along said path, transferring each tube closed at its said one end to a holder in which the tube is positioned upright with its closed end down, conveying the holders with the tubes therein one after another along a predetermined path, filling the tubes held by the holders through the open upper ends of the tubes as the holders proceed along their said path, and closing the upper ends of the filled tubes held by the holders as the holders proceed farther along their said path.

4. The method of claim 1 wherein each holder is positioned for closing the upper end of the filled tube held thereby in a plane at an angle to the closure at the lower end of the tube so that the package formed therefrom has the shape of a tetrahedron.

5. The method of forming, filling and sealing packages comprising conveying a succession of tube holders one after another through an endless path, forming flexible packaging material into a succession of individual open-ended tubes, forming a seal at one end of each tube, transferring each tube sealed at its said one end to a holder proceeding along said endless path, the tube being positioned upright in said holder with the sealed end of the tube down, filling the tubes held by the holders through the open upper ends of the tubes as the holders proceed along their said path, forming seals at the upper ends of the filled tubes held by the holders as the holders proceed farther along their said path to complete the formation of the tubes into packages, and removing the packages from the holders.

6. The method of claim 5 wherein each holder is positioned for forming the seal at the upper end of the filled tube held thereby in a plane at an angle to the seal at the lower end of the tube so that the package formed therefrom has the shape of a tetrahedron.

7. The method of forming, filling and sealing packages comprising conveying a succession of tube holders one after another through an endless path, forming flexible packaging material into a succession of individual open-ended tubes, conveying the tubes one after another along a predetermined path in register with a portion of the path of the holders, forming a seal at one end of each tube as it proceeds along its said path, transferring each tube sealed at its said one end as the tube proceeds along its said path to a holder proceeding along its said path, the tube being positioned vertically in said holder with the sealed end of the tube down, filling the tubes held by the holders through the open upper ends of the tubes as the holders proceed along their said path, forming seals at the upper ends of the filled tubes held by the holders as the holders proceed farther along their said path to complete the formation of the tubes into packages, and removing the packages from the holders.

8. The method of claim 7 wherein each tube is cradled in a respective holder and the holder is rotated on the vertical axis of the tube to position it for forming the seal at the upper end of the filled tube held thereby in a plane at an angle to the seal at the lower end of the tube so that the package formed therefrom has the shape of a tetrahedron.

9. The method of forming, filling and sealing packages comprising conveying a succession of open-topped receptacles one after another through an endless horizontal path, forming flexible packaging material into a succession of individual open-ended tubes and feeding said tubes endwise one after another to a transfer station, picking up the tubes at said transfer station and conveying them along a horizontal path located above a portion of the path of said receptacles with each tube held in an upright position as it travels along its said path, forming a seal at the lower end of each tube as it proceeds along its said path, transferring each tube after sealing of its lower end downward into a receptacle proceeding along its said path, each tube being held in vertical position in the receptacle with the sealed end of the tube down, filling the tubes in said receptacles through the open upper ends of the tubes as the receptacles proceed along their path, forming seals at the upper ends of the filled tubes in said receptacles as the receptacles proceed farther along their said path to complete the formation of the tubes into packages, and removing the packages from the receptacles.

10. The method of claim 9 wherein the tubes are fed in generally horizontal position to said transfer station and are turned to upright position during the initial phase of their course of travel along their said path and prior to the sealing of their lower ends.

11. The method of claim 9 wherein each tube in the course of its travel along its said path has its lower end positioned between a pair of sealing members, and said sealing members are closed on the lower end of the tube to seal it.

12. The method of claim 11 wherein each receptacle is rotated on a vertical axis prior to transfer of a tube thereto to orient it in respect to the seal formed at the lower end of the tube.

13. The method of claim 11 wherein each receptacle carrying a filled tube is raised to bring its upper end between a pair of sealing members and the latter are closed on the upper end of the tube to seal it.

14. The method of claim 13 wherein each receptacle carrying a filled tube is rotated on a vertical axis prior to forming the top seal on the tube or orient the bottom seal of the tube in predetermined relation to the sealing members for forming the top seal.

15. The method of claim 14 wherein the receptacle is rotated to position the bottom seal at right angles to the sealing members which form the top seal so that the top seal is formed at right angles to the bottom seal.

16. Packaging apparatus comprising a plurality of holders each adapted to hold upright a tube of flexible packaging material closed at the bottom and open at the top, means for conveying the holders along a predetermined path, means for transferring tubes closed at the bottom and open at the top to the holders as they proceed along said path to convey the tubes along said path, means for filling the tubes through their open tops as they proceed along said path, and means for sealing the tops of the tubes as they proceed farther along said path.

17. Packaging apparatus comprising means for forming flexible packaging material into open-ended tubes, means for sealing one end of each tube, a plurality of holders each adapted to hold one of the tubes upright with its sealed end at the bottom, means for conveying the holders along a predetermined path, means for transferring the bottom-sealed tubes to the holders as they proceed along said path to convey the tubes along said path, means for filling the tubes through their open tops as they proceed along said path, and means for sealing the tops of the tubes as they proceed farther along said path.

18. Packaging apparatus comprising a bottom-sealing unit, a filler and a top-sealing unit, said bottom-sealing unit comprising means for sealing open-ended tubes of flexible packaging material at their bottom ends, means in said bottom-sealing unit for carrying holders adapted to receive the bottom-sealed tubes, means in said bottom-sealing unit for transferring the bottom-sealed tubes to the holders, means for conveying the holders with the bottom-sealed tubes therein from the bottom-sealing unit to the filler for filling the tubes, and means for conveying the holders with the filled tubes therein from the filler to the top-sealing unit, the top-sealing unit comprising means for sealing the tops of the tubes while held by said holders.

19. Packaging apparatus as set forth in claim 18 further comprising means for conveying the holders from the top-sealing unit back to the bottom-sealing unit.

20. Packaging apparatus as set forth in claim 18 wherein the top-sealing means is adapted to form the top seal on each tube at an angle to the bottom seal on the tube so as to form packages of tetrahedron shape.

21. Packaging apparatus comprising a plurality of open-topped receptacles each adapted to hold upright a tube of flexible packaging material sealed at the bottom and open at the top, means for conveying the receptacles along a predetermined path, means for depositing tubes sealed at the bottom and open at the top in the receptacles as they proceed along said path to convey the tubes along said path, means for filling the tubes held in the receptacles as they proceed along said path, and means for sealing the tops of the tubes held in the receptacles as they proceed farther along said path.

22. Packaging apparatus as set forth in claim 21 having means for orienting the receptacles to orient the tubes for placement of the top seals in predetermined relation to the bottom seals.

23. Packaging apparatus as set forth in claim 22 wherein said orienting means orients the tubes for placement of the top seals at an angle to the bottom seals to form packages of tetrahedron shape.

24. Packaging apparatus comprising means for forming flexible packaging material into open-ended tubes, means for sealing one end of each tube, a plurality of open-topped receptacles each adapted to hold one of the tubes upright with its sealed end at the bottom, means for conveying the receptacles along a predetermined path, means for depositing the bottom-sealed tubes in the receptacles as they proceed along said path to convey the tubes along said path, means for filling the tubes held in the receptacles as they proceed along said path, and means for sealing the tops of the tubes held in the receptacles as they proceed farther along said path.

25. Packaging apparatus as set forth in claim 24 having first means for orienting the receptacles for reception of the tubes, and second means for orienting the receptacles to orient the tubes for placement of the top seals in predetermined relation to the bottom seals.

26. Packaging apparatus as set forth in claim 25 wherein said second orienting means orients the tubes for placement of the top seals at an angle to the bottom seals to form packages of tetrahedron shape.

27. Packaging apparatus comprising a bottom-sealing unit, a filler and a top-sealing unit, said bottom-sealing unit comprising means for sealing open-ended tubes of flexible packaging material at their bottom ends, means for delivering open-ended tubes to be sealed to said bottom-sealing unit, means in said bottom-sealing unit for carrying open-topped receptacles adapted to receive the bottom-sealed tubes with the tubes held upright therein, means in the bottom-sealing unit for depositing the bottom-sealed tubes in said receptacles, means for conveying the receptacles with the bottom-sealed tubes therein from the bottom-sealing unit to the filler for filling the tubes through their open tops, and means for conveying the receptacles with the filled tubes therein from the filler to the top-sealing unit, the top-sealing unit comprising means for sealing the tops of the tubes while the tubes are in said receptacles.

28. Packaging apparatus as set forth in claim 27 having first means in the bottom-sealing unit for rotating the receptacles to orient them for reception of the tubes, and second means in the top-sealing unit for orienting the receptacles to orient the tubes for placement of the top seals in predetermined relation to the bottom seals.

29. Packaging apparatus as set forth in claim 28 wherein said second orienting means orients the tubes for placement of the top seals at an angle to the bottom seals to form packages of tetrahedron shape.

30. Packaging apparatus comprising a bottom-sealing unit, a filler and a top-sealing unit, said bottom-sealing unit comprising a turret rotatable on a vertical axis, a series of bottom sealers spaced at equal intervals around the turret and rotatable therewith, each bottom sealer being adapted to seal the bottom of an open-ended tube of flexible packaging material, a series of tube carriers, one for each sealing unit, spaced at equal intervals around the turret and rotatable therewith, each tube carrier being located above a respective bottom sealer and being adapted to carry an open-ended tube with its bottom in position for being sealed by the respective bottom sealer, means rotatable with the turret for holding a circular series of open-topped receptacles below the bottom sealers, each receptacle being adapted to receive a tube after the bottom thereof has been sealed and to hold it in upright position, means for delivering tubes to the tube carriers, means for delivering receptacles to the turret, means rotatable with the turret for transferring the bottom-sealed tubes to the receptacles, means for feeding the receptacles with the bottom-sealed tubes therein out of the turret and conveying them to the filler, means for conveying the receptacles with the filled bottom-sealed tubes therein from the filler to the top-sealing unit, said top-sealing unit comprising a turret rotatable on a vertical axis, a series of elevators spaced at equal intervals around the top-sealing turret, each adapted to receive a receptacle and to carry the receptacle around in a circular path, a series of top sealers spaced at equal intervals around the top-sealing turret, one above each elevator, and means for raising each elevator to position the top of the tube held in the receptacle thereon for being sealed by the respective top sealer.

31. Packaging apparatus as set forth in claim 30 wherein the means for delivering tubes to the tube carriers delivers them in horizontal position and the tube carriers are operable to turn the tubes to upright position for being sealed by the bottom sealers.

32. Packaging apparatus as set forth in claim 31 wherein each bottom sealer comprises a pair of sealing heads movable toward and away from one another between an open nad a closed position, and said means for transferring the bottom-sealed tubes to the receptacles comprises a series of vertically movable plungers, one for each bottom sealer, rotatable with the bottom-sealing turret, each plunger having means thereon adtpted to enter the open top of a tube, and means for moving the plungers downward for transferring the tubes after their bottoms have been sealed from the tube carriers to the receptacles.

33. Packaging apparatus as set forth in claim 32 wherein each receptacle has clamping means for clamping the bottom seal of a tube, and means is provided for rotating the receptacles to orient their clamping means for receiving the bottom seals.

34. Packaging apparatus as set forth in claim 30 having means associated with the top-sealing turret for rotating the receptacles on the elevators to orient the bottom seals in predetermined relation to the top sealers.

35. Packaging apparatus as set forth in claim 30 having means for feeding the receptacles out of the top-sealing turret and conveying them back to the bottom-sealing turret.

36. Packaging apparatus comprising a turret rotatable on a vertical axis, a series of sealers spaced at equal intervals around the turret and rotatable therewith, each adapted to seal the bottom of an open-ended tube of flexible packaging material, a series of tube carriers, one for each sealing unit, spaced at equal intervals around the turret and rotatable therewith, each tube carrier being located above a respective sealer and being adapted to carry an open-ended tube with its bottom in position for being sealed by the respective bottom sealer, means rotatable with the turret for holding a series of open-topped receptacles below the bottom sealers, each receptacle being adapted to receive a tube after the bottom thereof has been sealed and to hold it in upright position, and means rotatable with the turret for transferring the bottom-sealed tubes to the receptacles.

37. Packaging apparatus as set forth in claim 36 wherein each sealer comprises a pair of sealing heads movable toward and away from one another between an open and a closed position, and said transferring means comprises a series of vertically movable plungers, one for each sealer, rotatable with the turret, each plunger having means thereon adapted to enter the open top of a tube, and means for moving the plungers downward for transferring the tubes after their bottoms have been sealed from the tube carriers to the receptacles.

38. Packaging apparatus as set forth in claim 37 wherein each receptacle has clamping means for clamping the bottom seal of a tube, and means is provided for rotating the receptacles to orient their clamping means for receiving the bottom seals.

39. Packaging apparatus as set forth in claim 38 wherein each receptacle comprises a can having a cradle therein for cradling a bottom-sealed tube with the bottom seal extending diametrically of the can at its bottom, said cradle including spring finger means at its lower end for clamping the bottom seal.

40. Packaging apparatus as set forth in claim 39 wherein said means for holding the receptacles comprises a series of elevators, one below each sealer, each elevator being adapted to receive a can, and wherein means is provided for raising each elevator to raise the can thereon, and wherein a fixed wiper is provided for rotating the raised cans to orient their clamping means for receiving the bottom seals.

41. Packaging apparatus comprising a turret rotatable on a vertical axis, a series of elevators spaced at equal intervals around the turret, each adapted to hold a receptacle having a bottom-sealed tube of flexible packaging material therein and to carry the receptacle around in a circular path, a series of sealers spaced at equal intervals around the turret, one above each elevator, and means for raising each elevator to position the top of the tube held in the receptacle thereon for being sealed by the respective top sealer.

42. Packaging apparatus as set forth in claim 41 having means associated with the turret for rotating the receptacles on the elevators to orient the bottom seals of the tubes in a predetermined relation to the sealers.

43. Packaging apparatus as set forth in claim 42 wherein said means for rotating the receptacles comprises a fixed wiper engageable by the receptacles.

References Cited
UNITED STATES PATENTS 2,322,430   6/1943   Fay _____ 53—179

GRANVILLE Y. CUSTER, JR., *Primary Examiner.*